(12) United States Patent
Igasaki et al.

(10) Patent No.: US 8,573,036 B2
(45) Date of Patent: Nov. 5, 2013

(54) SURFACE TEXTURE MEASURING INSTRUMENT

(75) Inventors: Shiro Igasaki, Kawasaki (JP); Masaoki Yamagata, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 498 days.

(21) Appl. No.: 12/923,119

(22) Filed: Sep. 2, 2010

(65) Prior Publication Data
US 2011/0005307 A1 Jan. 13, 2011

Related U.S. Application Data

(62) Division of application No. 11/806,614, filed on Jun. 1, 2007, now Pat. No. 7,814,779.

(30) Foreign Application Priority Data

Jun. 6, 2006 (JP) .................. 2006-157870

(51) Int. Cl.
*G01B 5/28* (2006.01)
(52) U.S. Cl.
USPC ........................................... 73/105
(58) Field of Classification Search
USPC ........................................... 73/105
See application file for complete search history.

(56) References Cited

U.S. PATENT DOCUMENTS

| | | | |
|---|---|---|---|
| 2002/0124427 A1* | 9/2002 | Nishimura et al. | 33/554 |
| 2003/0089163 A1 | 5/2003 | McWaid et al. | |
| 2004/0040373 A1* | 3/2004 | Saito | 73/105 |

FOREIGN PATENT DOCUMENTS

| | | |
|---|---|---|
| EP | 1 760 422 A1 | 3/2007 |
| JP | A-2001-264050 | 9/2001 |
| JP | A-2007-064891 | 3/2007 |

OTHER PUBLICATIONS

Sulchek et al., "Characterization and Optimization of Scan Speed for Tapping-Mode Atomic Force Microscopy", Review of Scientific Instruments, vol. 73, No. 8, pp. 2928-2936, Aug. 2002.
Mar. 19, 2013 Office Action issued in U.S. Appl. No. 12/923,120.

* cited by examiner

Primary Examiner — Hezron E Williams
Assistant Examiner — Mark A Shabman
(74) Attorney, Agent, or Firm — Oliff & Berridge, PLC

(57) ABSTRACT

A surface texture measuring instrument includes a force sensor (1), an actuator (11) and a detector (12). The surface texture measuring instrument further includes: a scanning controller (54) that collects a detection signal from the force sensor (1) and drives the actuator such that the detecting signal coincides with a target measurement value; a touch signal generator (51) that generates a touch signal when the detection signal from the force sensor (1) coincides with the target measurement value; and a measurement value collecting unit (55) that collects a measurement value from a counter (26) at a predetermined time interval in a state where a fluctuation range of the detection signal from the force sensor (1) is within a preset range when a scanning controller is in operation, the latch counter (52) collecting a measurement value from a latch counter (52) each time the touch signal is generated in a state where the detection signal from the force sensor (1) oscillates and an amplitude exceeds the preset range.

5 Claims, 18 Drawing Sheets

SURFACE TEXTURE MEASURING INSTRUMENT

CROSS-REFERENCE TO RELATED APPLICATIONS

This is a Division of application Ser. No. 11/806,614 filed Jun. 1, 2007, now U.S. Pat. No. 7,814,779 which in turn claims priority of Japanese Patent Application No. 2006-157870, filed Jun. 6, 2006. The disclosure of the prior application is hereby incorporated by reference herein in its entirety.

BACKGROUND OF THE INVENTION

1. Field of the Invention

The present invention relates to a surface texture measuring instrument. For example, the invention relates to a surface texture measuring instrument that measures a surface texture such as a profile or surface roughness of a workpiece by an oscillation-type force sensor.

2. Description of Related Art

As a surface texture measuring instrument that scans a surface of a workpiece and measures a surface texture such as a profile or surface roughness of the workpiece, a roughness measuring machine, a contour measuring machine, a roundness measuring machine, a coordinate measuring machine and the like are known.

In the measuring machines, an oscillation-type force sensor is used as a sensor for detecting a workpiece surface based on fine displacement caused when a contact portion contacts the workpiece surface.

<Oscillation-Type Force Sensor>

As shown in FIG. 10, an oscillation-type force sensor 1 (a measuring portion) includes a metal base 2, a stylus 3 integrally formed with the base 2, an oscillation element 4 that oscillates the stylus 3 (in an axial direction of the stylus 3) and a detection element 5 that detects an oscillation state of the stylus 3 and outputs a detection signal. A sensing pin 6 as a contact portion is adhered and fixed on a tip end of the stylus 3, the sensing pin 6 made from diamond-tip, ruby or the like. The oscillation element 4 and the detection element 5 constitute a measuring force detecting unit that detects a measuring force when the sensing pin 6 of the stylus 3 contacts the surface of the workpiece. The oscillation element 4 and the detection element 5 are each formed by a piezoelectric element. One oscillation element 4 and one detection element 5 are adhered and fixed on a front surface of the base 2 and on a rear surface of the base 2.

As shown in FIG. 11, when an oscillation signal Pi (a voltage signal) having a specific frequency and amplitude is given to the oscillation element 4 of the force sensor 1, the detection element 5 obtains a detection signal Qo (a voltage signal) having a specific frequency and amplitude.

FIG. 12 shows change in amplitude of the detection signal Qo which accompanies a contact with the workpiece. When the oscillation signal Pi having a certain oscillation at a resonance frequency of the stylus 3 is added to the oscillation element 4 in a state where the stylus 3 is not in contact with the workpiece, the stylus 3 resonates and the detection element 5 can obtain the detection signal Qo having an amplitude Ao. When the stylus 3 contacts the workpiece W, the amplitude of the detection signal Qo is attenuated from Ao to Ax.

The attenuation ratio k (Ax/Ao) and the measuring force have a relationship shown in FIG. 13.

Herein, taken as an example is a case in which the detection signal Qo generated when the stylus 3 (the force sensor 1) contacts the workpiece W is attenuated to 90% of that generated when the stylus 3 is not in contact with the workpiece W (the attenuation ratio k=0.9). From the relationship shown in FIG. 13, the measuring force in the non-contacting state is 135 [μN].

Accordingly, when the force sensor 1 is brought into contact with the workpiece W, it is possible to measure the profile and the roughness of the workpiece W with the constant measuring force by controlling a distance between the force sensor 1 and the workpiece W using the actuator or the like such that the attenuation ratio k is always constant.

<Texture Measuring System Using Force Sensor>

FIG. 14 shows an example of a texture measuring system using the force sensor 1. The texture measuring system includes a probe 10 and a controller 20 that controls the probe 10.

The probe 10 includes the force sensor 1, an actuator 11 that advances and retracts the force sensor 1 relative to the workpiece W and a detector (having a scale and a detection head) 12 that detects a displacement amount by which the force sensor 1 is displaced by the actuator 11 (measuring point information on the workpiece W when measured by the force sensor 1).

The controller 20 includes an oscillator 21 that gives the oscillation signal to the force sensor 1 in order to oscillate the force sensor 1, a peak hold circuit 22 that converts the detection signal from the force sensor 1 into a direct-current signal, an processing unit 23 that computes a deviation between an output from the peak hold circuit 22 (a force sensor signal) and a target measuring force, a force control compensator 24 that is input with an output from the processing unit 23, a drive amplifier 25 that drives the actuator 11 based on an output from the force control compensator 24 and a counter 26 that counts a signal from the detector 12 and outputs the measuring point information of the force sensor 1 as a position measurement value.

In FIG. 14, when the stylus 3 of the force sensor 1 is brought into contact with the workpiece W, the detection signal at that time is output from the force sensor 1. The detection signal is converted into a direct-current signal by the peak hold circuit 22 and then given to the processing unit 23. The processing unit 23 calculates the deviation between the detection signal from the peak hold circuit 22 (the force sensor signal) and the target measuring force. The deviation is multiplied by a gain of the force control compensator 24 and the result is given to the drive amplifier 25, so that the actuator 11 drives such that the deviation is eliminated.

<Method for Using Force Sensor as Probe>

FIG. 15 shows changes in the detection signal from the force sensor 1 (the force sensor signal) which is generated when the force sensor 1 moves from the non-contacting state to a contacting state.

When the force sensor 1 is brought into contact with the workpiece W and further pressed to the workpiece W, the detection signal from the force sensor 1 (the force sensor signal) gradually drops and becomes substantially coincident with the target measuring force to be stable in this state. In the state, when the force sensor 1 and the workpiece are relatively moved along the surface profile of the workpiece, since the detection signal from the force sensor 1 and the target measuring force are maintained to be substantially coincident with each other, the profile or the roughness of the workpiece can be scanning-measured with the constant measuring force by collecting the position measurement value from the detector 12.

<Method for Using Force Sensor as Touch Probe>

In the texture measuring system of FIG. 14, when the attenuation ratio becomes a desired value, the force sensor 1 can be used as a touch probe with the constant measuring force by incorporating a circuit that latches a current position.

As shown in FIG. 16, by comparing the force sensor signal representing the detection signal oscillation of the force sensor 1 with a contact detection level (a threshold value) for detecting a contact with the workpiece, it is possible to structure a circuit that outputs a touch signal representing a contact between the force sensor 1 and the workpiece. In this arrangement, the touch signal is generated when the force sensor signal passes the contact detection level (the threshold value), so that the same measuring force is always generated at the timing of the touch signal generation (thereby realizing higher precision).

As shown in FIG. 17, the measuring force can be also controlled by controlling the contact detection level (the threshold value) and a measurement with a lower measuring force can be enabled by raising the contact detection level, thereby realizing a ultra-precise measurement.

<Probe with Constant Force Scanning Measurement Function and Touch Measurement Function>

As understood from the above description, when the probe is used as a scanning probe or a touch probe, the force sensor can be used in a common way (under the same detection principle).

Note that there has been suggested a system that includes both functions of a scanning measurement and a touch measurement, drives a probe mounting portion by a coordinate drive mechanism that provides a three-dimensional drive and switches between the constant force scanning measurement and the touch measurement depending on the workpiece (Document: JP-A-2005-254016, for reference).

However, it is sometimes difficult to conduct a constant force scanning control due to the surface profile, the surface texture and property fluctuation owing to material of the workpiece or disturbance input to the system. When the constant force scanning control is difficult, namely when the force control is unstable, the scanning control may be oscillatory to cause variation in the measurement value, so that the high precision cannot be maintained. As a compensatory function, a switching is conducted between the constant force scanning measurement and the touch measurement.

For example, in a case shown in FIG. 18, when the scanning control becomes oscillatory during the scanning measurement, it becomes impossible to maintain the high precision due to variation in the measurement value, so that an operator judges the situation to manually switch from the scanning measurement mode to the touch measurement mode. Alternatively, when the oscillation range of the force sensor signal exceeds a preset predetermined value, a switching is conducted from the scanning measurement mode to the touch measurement mode. Further, by assuming in advance the surface profile of the workpiece, a switching from the scanning measurement mode to the touch measurement mode is automatically conducted upon an entry into a touch measurement region. Accordingly, the force sensor contacts the workpiece surface while repeating touch-back operations (i.e. operations in which the force sensor is moved away from the workpiece surface and brought into contact with the surface again) along the surface, so that the touch signal is collected at the timing of the touch signal generation.

However, in order to compensate the profile scanning measurement by the normal touch measurement, it is necessary to conduct the touch measurement at a shorter pitch than a workpiece profile cycle, which requires a longer measurement time.

Generally, the constant force scanning measurement is more advantageous than the touch measurement for measuring a fine profile, since a distance between data-measured points is smaller in the constant force scanning measurement than in the touch measurement, so that a fine profile cycle can be measured. Therefore, there have been demands for the use of the constant force scanning measurement as far as possible.

SUMMARY OF THE INVENTION

An object of the present invention is to provide a surface texture measuring instrument that can ensure high precision even under the presence of property fluctuation caused by a surface texture of a workpiece or disturbance and can ensure a scanning measurement with a constant measuring force while avoiding an increase in measurement time.

A surface texture measuring instrument according to an aspect of the invention includes: a measuring portion including a stylus having a contact portion that contacts a surface of a workpiece and a measuring force detecting unit that detects a measuring force when the contact portion contacts the surface of the workpiece; a relative movement unit that relatively moves the measuring portion and the workpiece; a position detecting unit that outputs as measuring point information a measuring point on which the workpiece is measured by the measuring portion, the measuring point information from the position detecting unit being collected while the relative movement unit is driven with the contact portion of the stylus contacting with the surface of the workpiece, a surface texture of the workpiece being measured from the measuring point information, a scanning controller that collects a detection measuring force from the measuring portion and drives the relative movement unit such that the detection measuring force substantially coincides with a target measuring force; a touch signal generating unit that collects the detection measuring force from the measuring portion and generates a touch signal when the detection measuring force coincides with a contact measuring force; and a measurement value collecting unit that collects the measuring point information from the position detecting unit based on a predetermined condition when a fluctuation range of the detection measuring force from the measuring potion is within a preset certain range, the measurement value collecting unit collecting the measuring point information from the position detecting unit each time the touch signal is generated from the touch signal generating unit when the detection measuring force from the measuring portion oscillates and an oscillation range exceeds a preset certain range, when the scanning controller is in operation.

According to the aspect of the invention, the detection measuring force from the measuring portion is collected by the scanning controller, and the scanning controller drives the relative movement unit such that the detection measuring force substantially coincides with the target measuring force. Accordingly, the surface texture of the workpiece is scanning-measured in a state in which the stylus of the measuring portion is in contact with the workpiece and the detection measuring force is controlled so as to be substantially coincident with the target measuring force.

Herein, when the fluctuation range of the detection measuring force from the measuring portion is within the preset certain range, the measuring point information from the position detecting unit is collected based on the predetermined condition. Hence, in this state, the measurement can be conducted in the normal scanning measurement. Note that the predetermined condition is a predetermined time interval or a predetermined positional interval.

On the other hand, in the scanning measurement, when the detection measuring force from the measuring portion oscillates and the oscillation exceeds the preset certain range, namely when the detection measuring force from the measuring portion becomes oscillatory due to specific fluctuation caused by the profile, material, surface texture and the like of the workpiece or disturbance, the measuring force fluctuates, causing variation in the measuring value.

In this state, the measuring point information from the position detecting unit is collected each time the touch signal is generated by the touch signal generating unit. Since the touch signal is generated when the detection measuring force coincides with the contact measuring force, it is possible to collect the measurement value with the constant measuring force. In addition, since the measurement accompanies no switching from the scanning measurement to the touch measurement, time loss in touch-back operations can be eliminated.

Hence, even under the presence of the property fluctuation caused by the surface texture of the workpiece and the like or the disturbance, the scanning measurement can be conducted with the constant measuring force while ensuring high precision and avoiding an increase in the measurement time.

A surface texture measuring instrument according to an aspect of the invention, includes: a measuring portion including a stylus having a contact portion that contacts a surface of a workpiece and a measuring force detecting unit that detects a measuring force when the contact portion contacts the surface of the workpiece; a relative movement unit that relatively moves the measuring portion and the workpiece; a position detecting unit that outputs as measuring point information a measuring point on which the workpiece is measured by the measuring portion, the measuring point information from the position detecting unit being collected while the relative movement unit is driven with the contact portion of the stylus contacting the surface of the workpiece, a surface texture of the workpiece being measured from the measuring point information, a scanning controller that collects a detection measuring force from the measuring portion and drives the relative movement unit such that the detection measuring force substantially coincides with a target measuring force; a touch signal generating unit that collects the detection measuring force from the measuring portion and generates a touch signal when the detection measuring force coincides with a contact measuring force; a switch unit that switches a scanning measurement mode and a touch measurement mode; and a measurement value collecting unit that collects the measuring point information from the position detecting unit based on a predetermined condition when the switch unit is switched to the scanning measurement mode, the measurement value collecting unit collecting the measuring point information from the position detecting unit each time the touch signal is generated from the touch signal generating unit in a state where the switch unit is in the touch measurement mode, when the scanning controller is in operation.

According to the aspect of the invention, since the switch unit that switches the scanning measurement mode and the touch measurement is provided, the measurement mode can be switched from the scanning measurement mode to the touch measurement mode by a switching operation with the switch unit. Accordingly, since the measuring point information from the position detecting unit is collected each time the touch signal is generated by the touch signal generating unit, the advantages similar to those described above can be expected. Note that the predetermined condition is the predetermined time interval or the predetermined positional interval.

In the surface texture measuring instrument according to the aspect of the invention, the switch unit may include a switch portion that switches between the scanning measurement mode and the touch measurement mode in accordance with a surface profile of the workpiece based on a selection made by a user.

According to the aspect of the invention, the user monitors an inclination or curvature of the workpiece surface and selects which part of the workpiece surface is to be scanning-measured or touch-measured. Since the user can arbitrarily select the measuring mode by the switching portion, the measurement mode can be selected more speedily and appropriately as compared with, for example, a case in which the instrument automatically selects the most appropriate measurement mode by repeating the scan-measurement and the touch measurement in a trial-and-error manner. Thus, an effective measurement can be realized.

In the surface texture measuring instrument according to the aspect of the invention, the switch unit may include a switch portion that switches between the scanning measurement mode and the touch measurement mode and a switching controller that controls the switch portion, and the switching controller switches the switch portion based on a change in the detection measuring force detected by the measuring force detecting unit.

In the scanning measurement, the detection measuring force from the measuring portion may be oscillatory depending on the surface profile or the material of the workpiece or a relative angle between a detecting direction and a normal line of the workpiece surface. In this state, the measuring force fluctuates, so that the measurement cannot be conducted with the constant measuring force.

According to the aspect of the invention, since the measurement mode is switched to the touch measurement based on a change in the measuring force detected by the measuring force detecting unit (for example, when the detection measuring force from the measuring portion oscillates and the oscillation range exceeds the preset certain range), the measuring mode can be selected more speedily and appropriately as compared with the arrangement in which the user manually selects the most appropriate measurement mode in a trial-and-error manner by arbitrarily switching the switching portion. Thus, an effective measurement can be realized In the surface texture measuring instrument according to the aspect of the invention, the switch unit may include a switch portion that switches between the scanning measurement mode and the touch measurement mode and a switching controller that controls the switch portion, and the switching controller may switch the switch portion based on the surface profile of the workpiece.

Herein, to switch the switching portion based on the surface profile of the workpiece conducted by the switching controller means, for example, a switching in which the surface profile of the workpiece is calculated based on data from an already-conducted measurement and the scanning measurement or the touch measurement is selected based on the curvature of the workpiece surface or an angle formed between the workpiece surface and the measuring force detecting direction. Alternatively, the profile of the workpiece surface is obtained from design data of the workpiece and the curvature or the inclination of the workpiece surface may be obtained from the design data.

According to the aspect of the invention, the surface profile of the workpiece is analyzed and a switching control to switch to the touch measurement is conducted based on the curvature, the inclination or the like, so that the user does not need to judge and switch, thereby simplifying the measurement. Even when the workpiece has a surface profile that cannot be measured in the scanning measurement, the profile measurement can be automatically conducted in the touch measurement.

In the surface texture measuring instrument according to the aspect of the invention, the scanning controller may include a processing unit that computes a deviation between the detection measuring force from the measuring portion and the target measuring force and outputs the deviation; and a gain adjusting unit that amplifies an output signal from the processing unit and gives the output signal to the relative movement unit, and a setting gain of the gain adjusting unit may be adjustable such that the detection measuring force from the measuring portion oscillates.

According to the aspect of the invention, an oscillating state of the detection measuring force from the measuring portion can be obtained by adjusting the setting gain of the gain adjusting unit, so that relative movement position data from the position detecting unit can be acquired cyclically at rapid timing. Hence, the precision can be more enhanced.

In the surface texture measuring instrument according to the aspect of the invention, the relative movement unit may include a fine feeding mechanism that finely displaces the measuring portion and a coarse feeding mechanism that displaces the measuring portion in cooperation with the fine feeding mechanism by a larger amount than the fine feeding mechanism, the scanning controller includes the processing unit that computes the deviation between the detection measuring force from the measuring portion and the target measuring force and outputs the deviation; and the gain adjusting unit that amplifies an output signal from the processing unit and gives the output signal to the fine feeding mechanism, and the setting gain of the gain adjusting unit may be adjustable such that the detection measuring force from the measuring portion oscillates.

Herein, the fine feeding mechanism may be a drive mechanism that has high response speed. For example, the fine feeding mechanism may be a piezoelectric actuator using a piezoelectric element. The coarse feed mechanism may be an electromagnetic actuator.

According to the aspect of the invention, since the fine feeding mechanism and the coarse feed mechanism are provided, in the scanning measurement, it is possible to speedily and finely displace the contact portion in response to fine unevenness of the workpiece surface by the fine feeding mechanism that has the high response speed, while it is possible to respond to large profile change (undulation and the like) of the workpiece surface by the coarse feed mechanism capable of responding to a large displacement. As a result, the contact portion can be precisely and speedily moved in a scanning manner along the workpiece surface.

A surface texture measuring instrument according to an aspect of the invention includes: a measuring portion including a stylus having a contact portion that contacts a surface of a workpiece and a measuring force detecting unit that detects a measuring force when the contact portion contacts the surface of the workpiece; a relative movement unit that relatively moves the measuring portion and the workpiece; a position detecting unit that outputs as measuring point information a measuring point on which the workpiece is measured by the measuring portion, a force control loop that collects a measuring force detected by the measuring portion and drives the relative movement unit such that the detection measuring force substantially coincides with a target measuring force; a touch signal generating unit that collects the detection measuring force detected by the measuring portion and generates a touch signal when the detection measuring force coincides with a contact measuring force; and a measurement value collecting unit that collects the measuring point information from the position detecting unit each time the touch signal is generated from the touch signal generating unit. The force control loop is adjustable such that the detection measuring force detected by the measuring force detecting unit oscillates.

According to the aspect of the invention, the force control loop is set such that the detection measuring force detected by the measuring force detecting unit oscillates with the contact portion of the stylus in contact with the workpiece surface. The measurement is conducted in this state. Accordingly, the touch signal is generated each time the detection measuring force coincides with the target measuring force and the measuring point information from the position detecting unit is collected by the measurement value collecting unit each time the touch signal is generated.

In other words, since the touch signal is generated utilizing the oscillating state of the detection measuring force, a high-speed touch signal can be generated and the measuring point information can be collected at the timing of the generation of such a touch signal, thereby realizing a precise measurement. Particularly, since the measurement is conducted utilizing the unstable oscillation of the force control loop, it is possible to stably trace the profile with tolerance to the disturbance. Thus, it is possible to measure the workpiece including a steeply inclined surface, thereby increasing scanning speed.

Hence, even under the presence of the specific fluctuation caused by the surface texture of the workpiece and the like and the disturbance, the scanning measurement can be conducted with the constant measuring force while ensuring high precision and avoiding an increase in the measurement time.

In the surface texture measuring instrument according to the aspect of the invention, the force control loop may include a processing unit that computes a deviation between the detection measuring force detected by the measuring force detecting unit and the target measuring force and outputs the deviation; and a gain adjusting unit that amplifies an output from the processing unit by a setting gain and gives the output to the relative movement unit, and the setting gain of the gain adjusting unit of the force control loop may be adjustable such that the detection measuring force detected by the measuring force detecting unit oscillates.

According to the aspect of the invention, the oscillating state of the detection measuring force from the measuring portion can be obtained by adjusting the setting gain of the gain adjusting unit, so that relative movement position data from the position detecting unit can be cyclically acquired at rapider timing. Hence, the precision can be more enhanced.

In the surface texture measuring instrument according to the aspect of the invention, the relative movement unit may include a fine feeding mechanism that finely displaces the measuring portion and a coarse feed mechanism that displaces the measuring portion in cooperation with the fine feeding mechanism by a larger amount than the fine feeding mechanism. The force control loop may include a processing unit that computes a deviation between the detection measuring force detected by the measuring force detecting unit and the target measuring force and outputs the deviation; and a gain adjusting unit that amplifies an output from the processing unit by a setting gain and gives the output to the fine feeding mechanism. The setting gain of the gain adjusting unit of the force control loop may be adjustable such that the detection measuring force detected by the measuring portion oscillates.

According to the aspect of the invention, since the fine feeding mechanism and the coarse feed mechanism are provided, in the scanning measurement, it is possible to speedily and finely displace the contact portion in response to fine unevenness of the workpiece surface by the fine feeding mechanism that has the high response speed, while it is possible to respond to large profile change (undulation and the like) of the workpiece surface by the coarse feed mechanism capable of responding to a large displacement. As a result, the contact portion can be moved in a scanning manner along the workpiece surface precisely and speedily.

In the surface texture measuring instrument according to the aspect of the invention, the touch signal generating unit may generate a touch signal when the detection measuring force from the measuring portion passes the contact measuring force from a value higher than the contact measuring force and when the detection measuring force from the measuring portion passes the contact measuring force from a value lower than the contact measuring force.

According to the aspect of the invention, the touch signal is generated when the detection measuring force from the measuring portion passes the contact measuring force from a value higher than the contact measuring force and when the detection measuring force from the measuring portion passes the contact measuring force from a value lower than the contact measuring force, so that the measuring point information from the position detecting unit can be acquired cyclically at a rapid timing. Hence, the precision can be more enhanced.

In the surface texture measuring instrument according to the aspect of the invention, the measuring portion may include: an oscillation element that oscillates the stylus; and a detection element that detects an oscillation of the stylus (3) to be output as a detection signal.

According to the aspect of the invention, when the contact portion contacts the workpiece surface and the oscillation of the stylus is suppressed, the oscillation level becomes small. From the difference in the oscillation, the measuring force that is applied on the contact portion from the workpiece surface can be detected. In particular, since the measuring force is detected from the attenuation of the oscillation caused by suppressing the oscillation, so that the measuring force can be precisely detected even when the measuring force is low.

DETAILED DESCRIPTION OF PREFERRED EMBODIMENT(S)

First Embodiment

Figure 1:
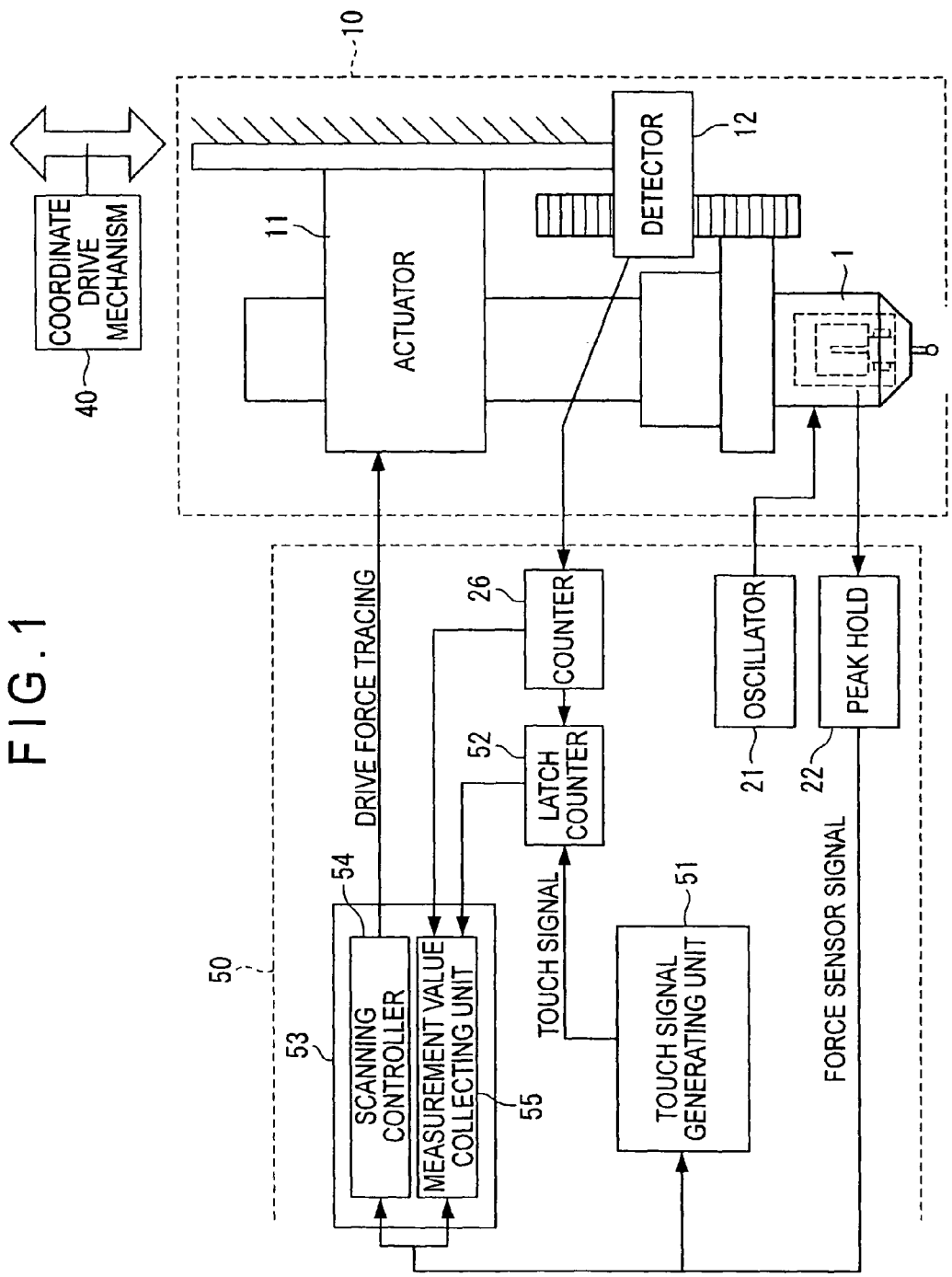
FIG. 1 is a block diagram showing a first embodiment of a surface texture measuring instrument according to the invention.

Description of Overall Arrangement of First Embodiment (FIG. 1)

FIG. 1 is a block diagram showing a first embodiment of a surface texture measuring instrument according to the invention. The same components between FIG. 1 and FIG. 14 are given the same reference numerals and explanation for the components will be omitted or simplified in the description of FIG. 1.

The surface texture measuring instrument of the first embodiment includes a probe 10, a coordinate drive mechanism 40 and a controller 50 that controls the probe 10.

Figure 14:
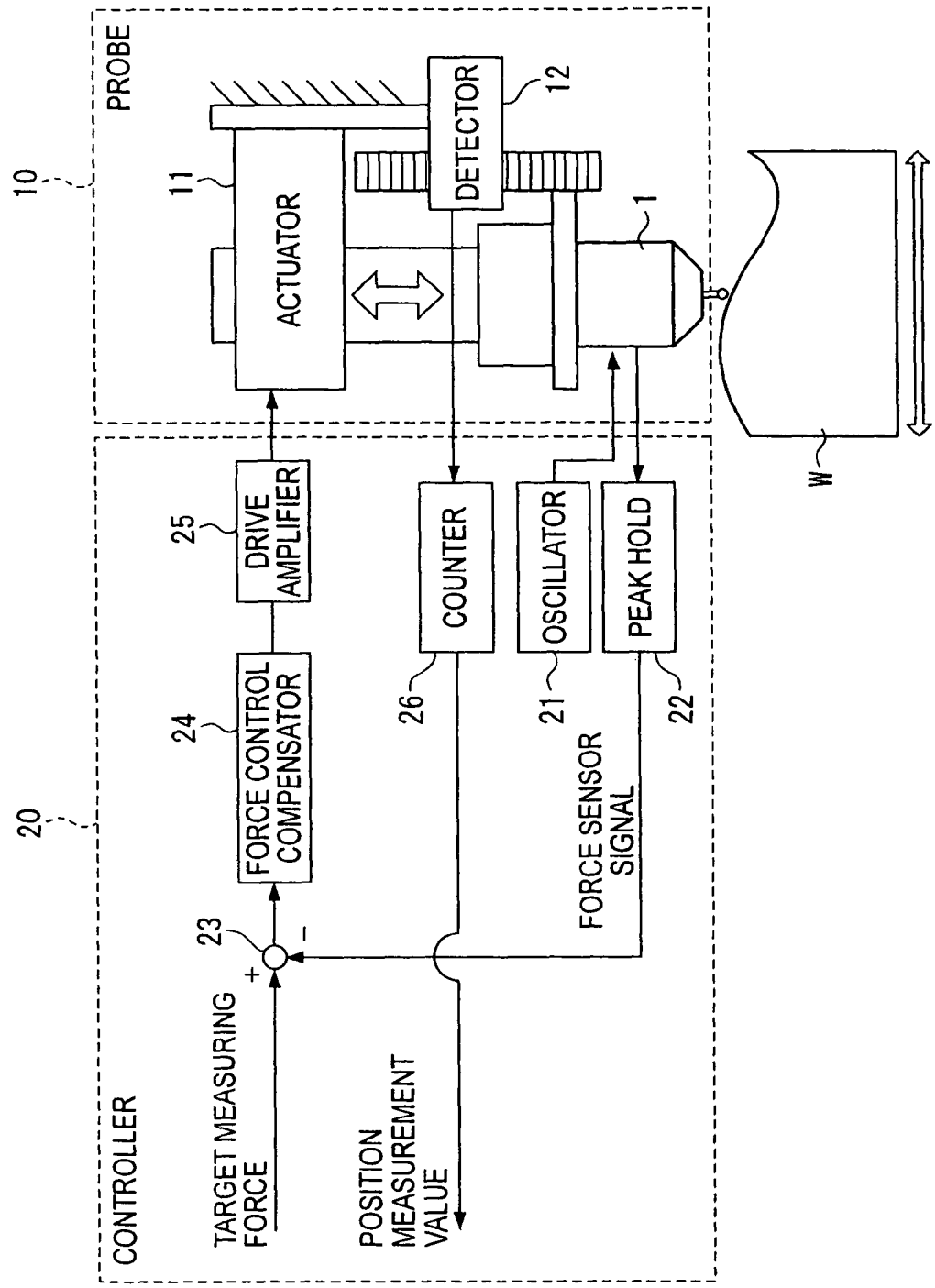
FIG. 14 is a block diagram showing a texture measuring system using the force sensor.
Figure 15:
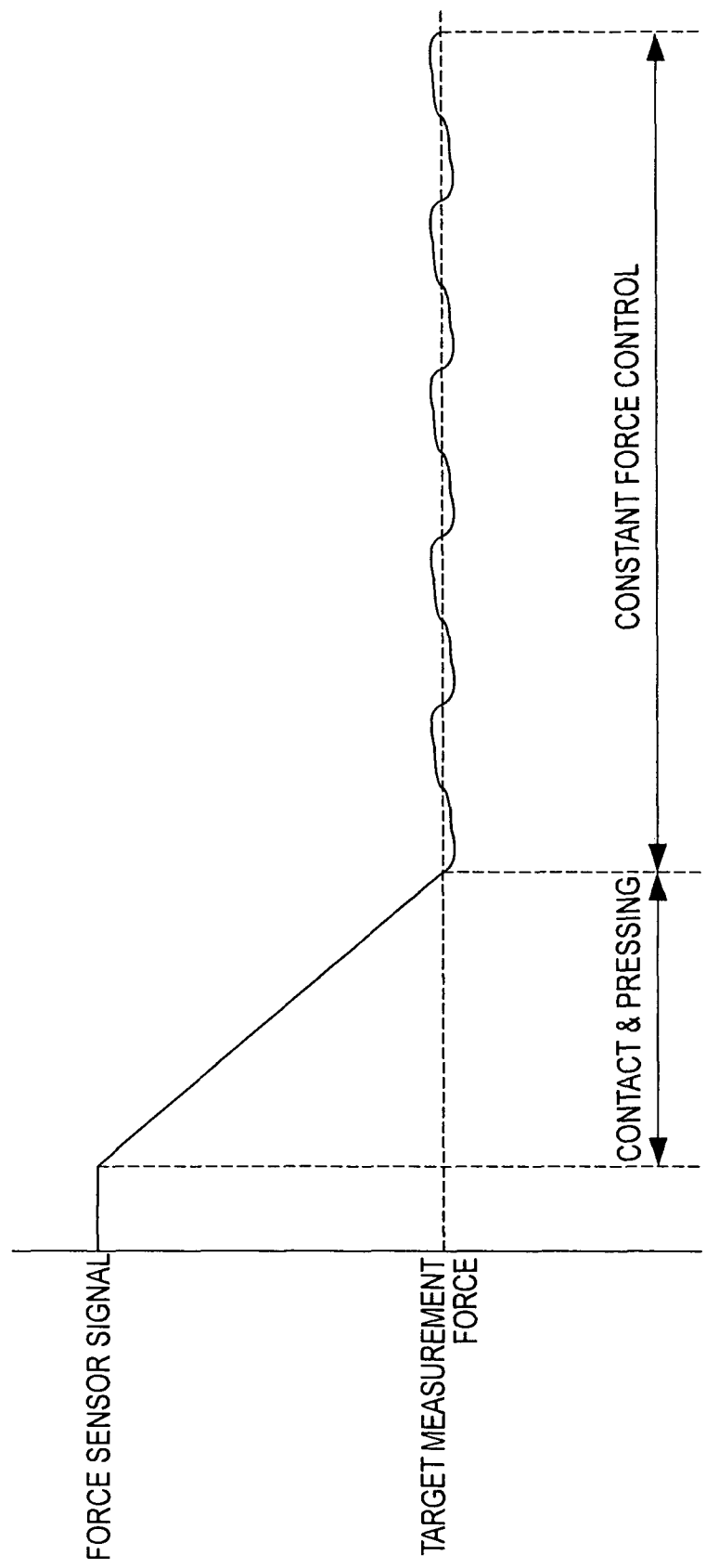
FIG. 15 is a diagram showing changes in the force sensor signal in the system of FIG. 14.
Figure 16:
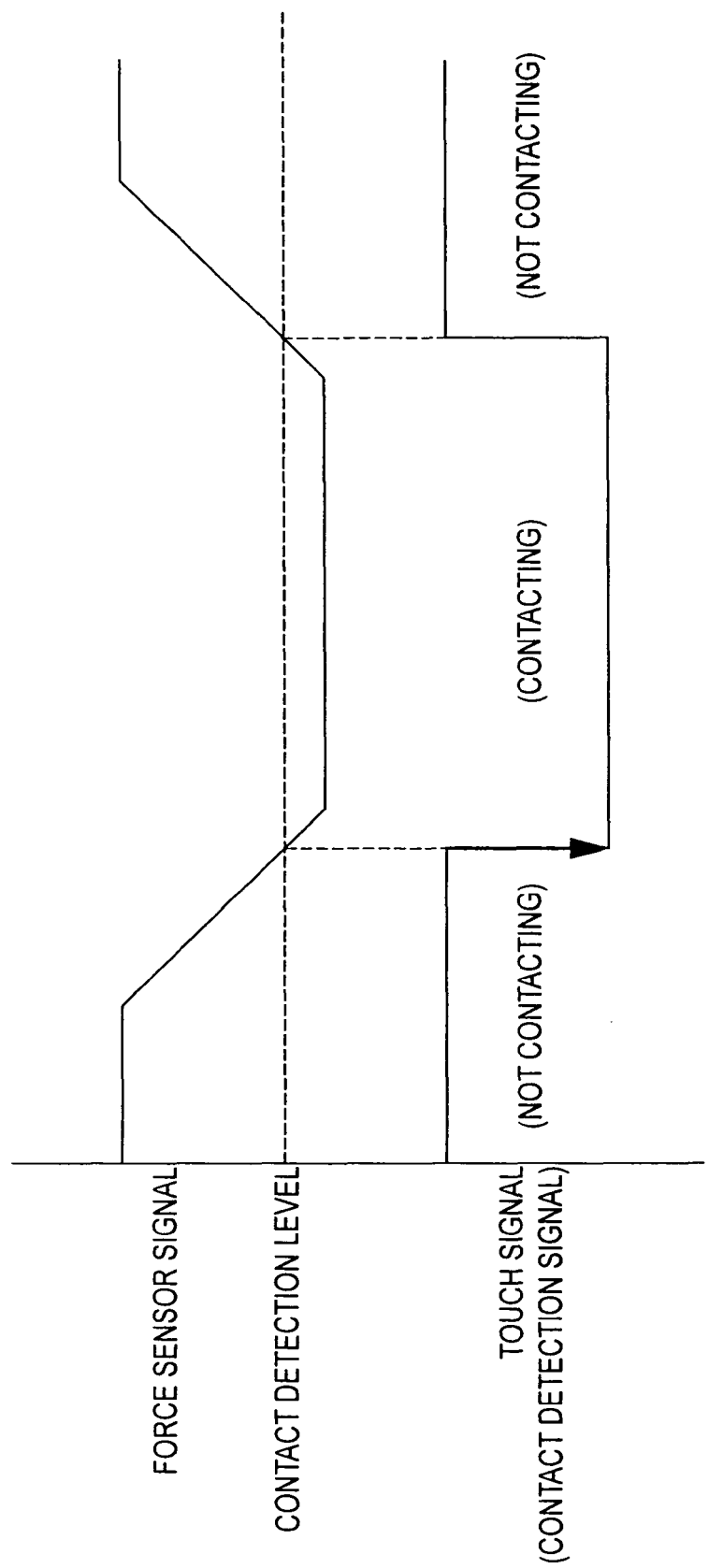
FIG. 16 is a diagram showing a relationship among the force sensor signal, a contact detection level and the touch signal in the system of FIG. 14.
Figure 17:
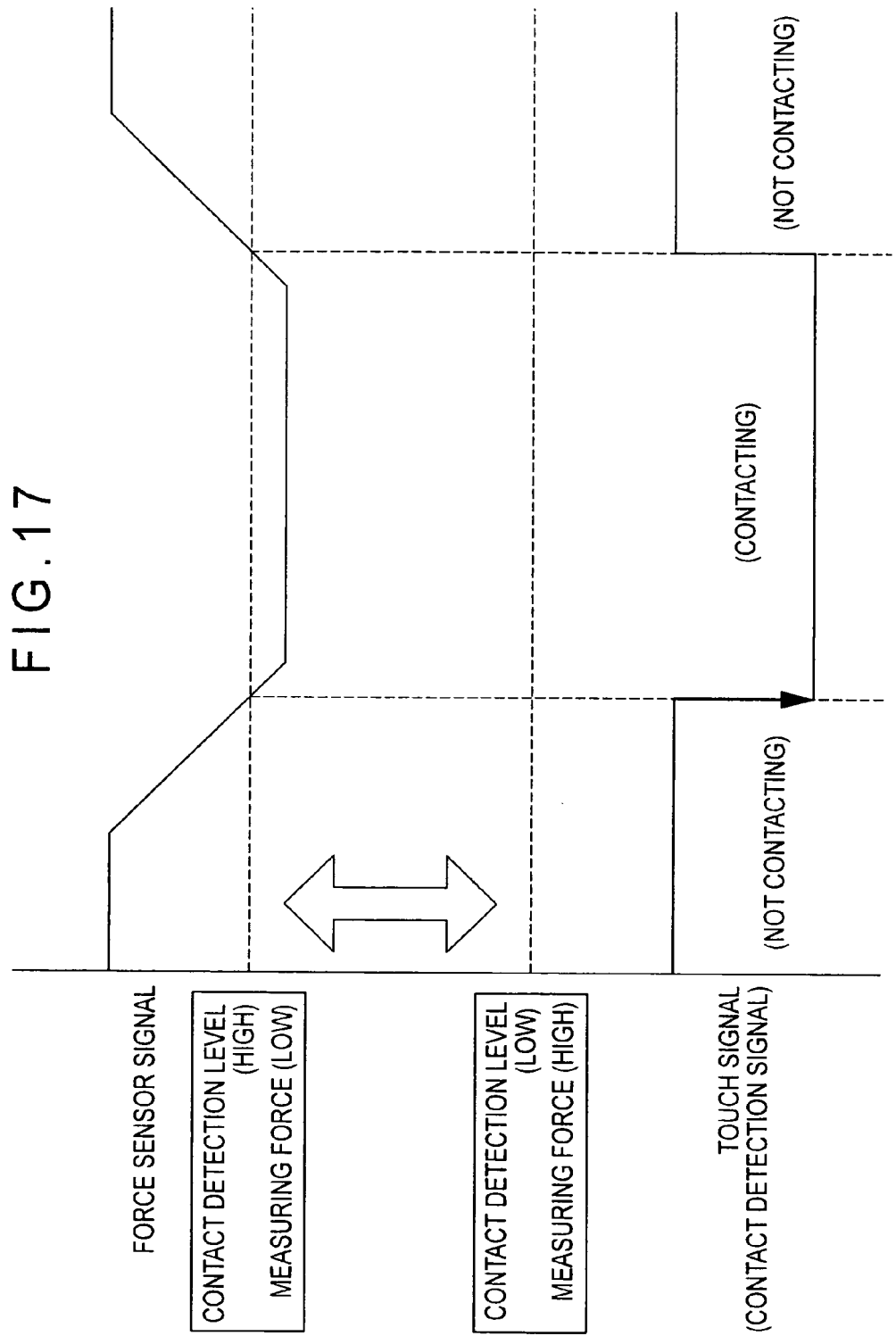
FIG. 17 is a diagram showing a result from fluctuating the contact detection level up and down in the system of FIG. 14.
Figure 18:
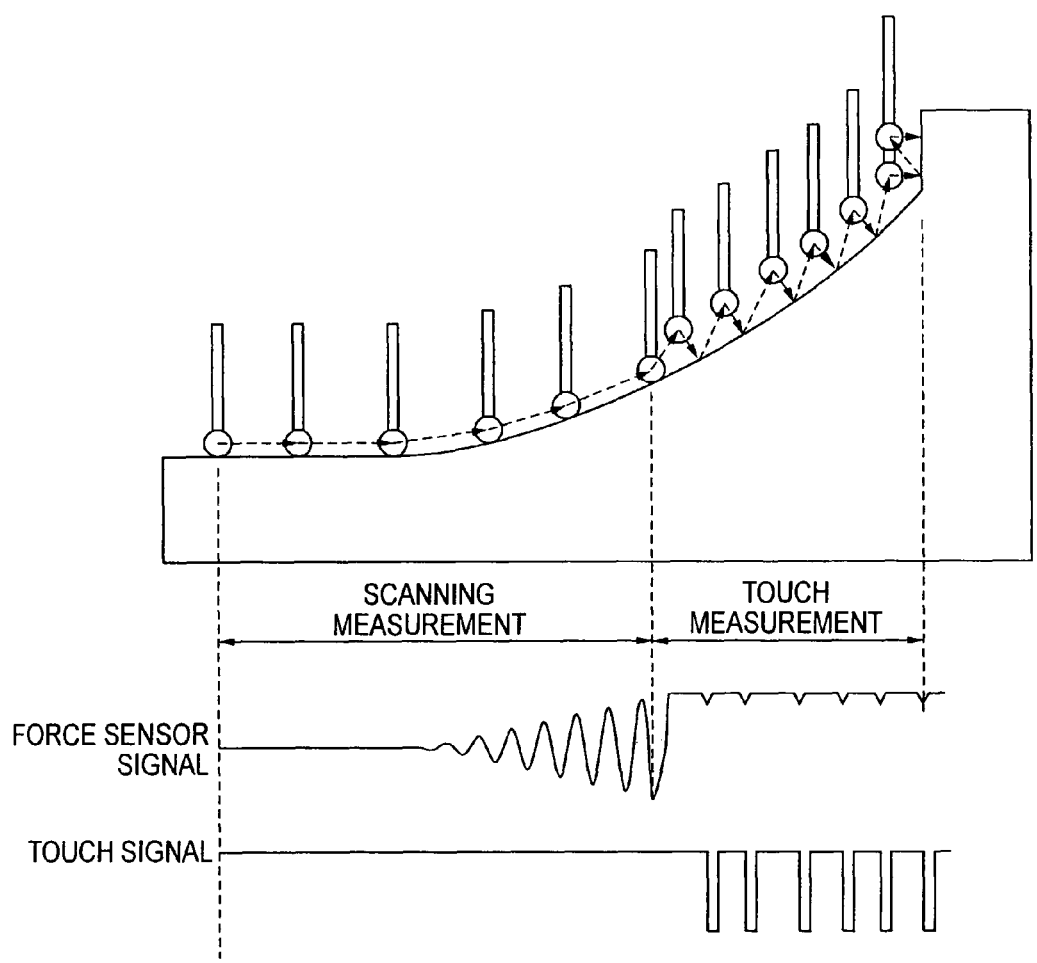
FIG. 18 is a diagram showing a result when the force sensor signal oscillates in a system having a scanning measurement mode a touch measurement mode.

Similarly to FIG. 14, the probe 10 includes: a force sensor 1; an actuator 11 as a relative movement unit that moves (advances and retracts) the force sensor 1 relative to a workpiece W; and a detector 12 as a position detecting unit that detects a displacement amount in which the force sensor 1 is moved by the actuator 11 (namely, measuring point information on a measuring point of the workpiece W when measured by the force sensor 1), the detector 12 including a scale and a detecting head.

The coordinate drive mechanism 40 and the actuator 11 constitute the relative movement unit. The coordinate drive mechanism 40 drives a mount portion of the probe 10 in three dimensional directions (the X-, Y- and Z-axis directions). Note that the coordinate drive mechanism 40 is not limited to an arrangement in which the probe 10 is driven in the three dimensional directions. The coordinate drive mechanism 40 may drive the workpiece W in at least the three dimensional directions or may drive one of the probe 10 and the workpiece W in one axis direction and the other in the other axis directions.

The controller 50 includes an oscillator 21, a peak hold circuit 22 and the counter 26 similarly to FIG. 14, the controller 50 further including a touch signal generator 51, a latch counter 52 and a scanning measurement controller 53.

The touch signal generator 51 (a touch signal generating unit) collects a detection signal from the force sensor 1 (a force sensor signal as a detection measuring force) via the peak hold circuit 22. When the detection signal coincides with a contact measuring force as a setting value (a contact detection level), herein when the detection signal passes the contact measuring force (the contact detection level) from a value higher than the contact measuring force, the touch signal generator 51 generates a touch signal and gives the touch signal to the latch counter 52.

The latch counter 52 latches a count value of the counter 26 each time the touch signal is given by the touch signal generator 51 and gives the count value to the scanning measurement controller 53 (a later-described measurement value collecting unit 55).

The scanning measurement controller 53 includes a scanning controller 54 and the measurement value collecting unit 55.

The scanning controller 54 collects the detection signal from the force sensor 1 via the peak hold circuit 22, the scanning controller 54 driving the actuator 11 such that the detection signal substantially coincides with a target measuring force that is the setting value. Although not shown, similarly to FIG. 14, the scanning controller 54 includes a processing unit 23 that computes a deviation between an output from the peak hold circuit 22 (the force sensor signal) and the target measuring force, a force control compensator 24 to which an output from the processing unit 23 is input and a drive amplifier 25 that drives the actuator 11 based on the output from the force control compensator 24.

When the scanning controller 54 is in operation, the measurement value collecting unit 55 collects the detection signal from the force sensor 1 (the force sensor signal) via the peak hold circuit 22 and judges whether or not a fluctuation range of the detection signal is within a preset certain range (whether or not the fluctuation range is a range of which variation in a measurement value is ignorable). When the fluctuation range of the detection signal is within the preset certain range, the measurement value collecting unit 55 collects a position measurement value (the measuring point information) at a predetermined time interval. When the detection signal from the force sensor 1 oscillates and its oscillation range exceeds the preset certain range, the measurement value collecting unit 55 collects the position measurement value (the measuring point information) which the latch counter 52 latches each time the touch signal is generated from the touch signal generator 51.

<Scanning Measurement with Constant Force>

The detection signal from the force sensor 1 (the force sensor signal) is collected by the scanning controller 54 and the scanning controller 54 drives the actuator 11 such that the detection signal substantially coincides with the target measuring force (a reference value). Accordingly, a stylus 3 of the force sensor 1 contacts the workpiece, and a surface texture of the workpiece is scanning-measured with the measuring force maintained to the target measuring force.

When a constant force control is stably controlled (for example, as shown in FIG. 14), deformation amounts of the force sensor 1 and the workpiece are constant, so that a measurement can be conducted with the variation in the measurement value suppressed.

However, when it becomes difficult to conduct a constant force scanning control due to property fluctuation caused by the surface profile, surface texture or material of the workpiece or disturbance input to the system, the deformation amounts of the force sensor 1 and the workpiece change in accordance with the unstable measuring force. Hence, the variation in the measuring value becomes large.

Figure 2:
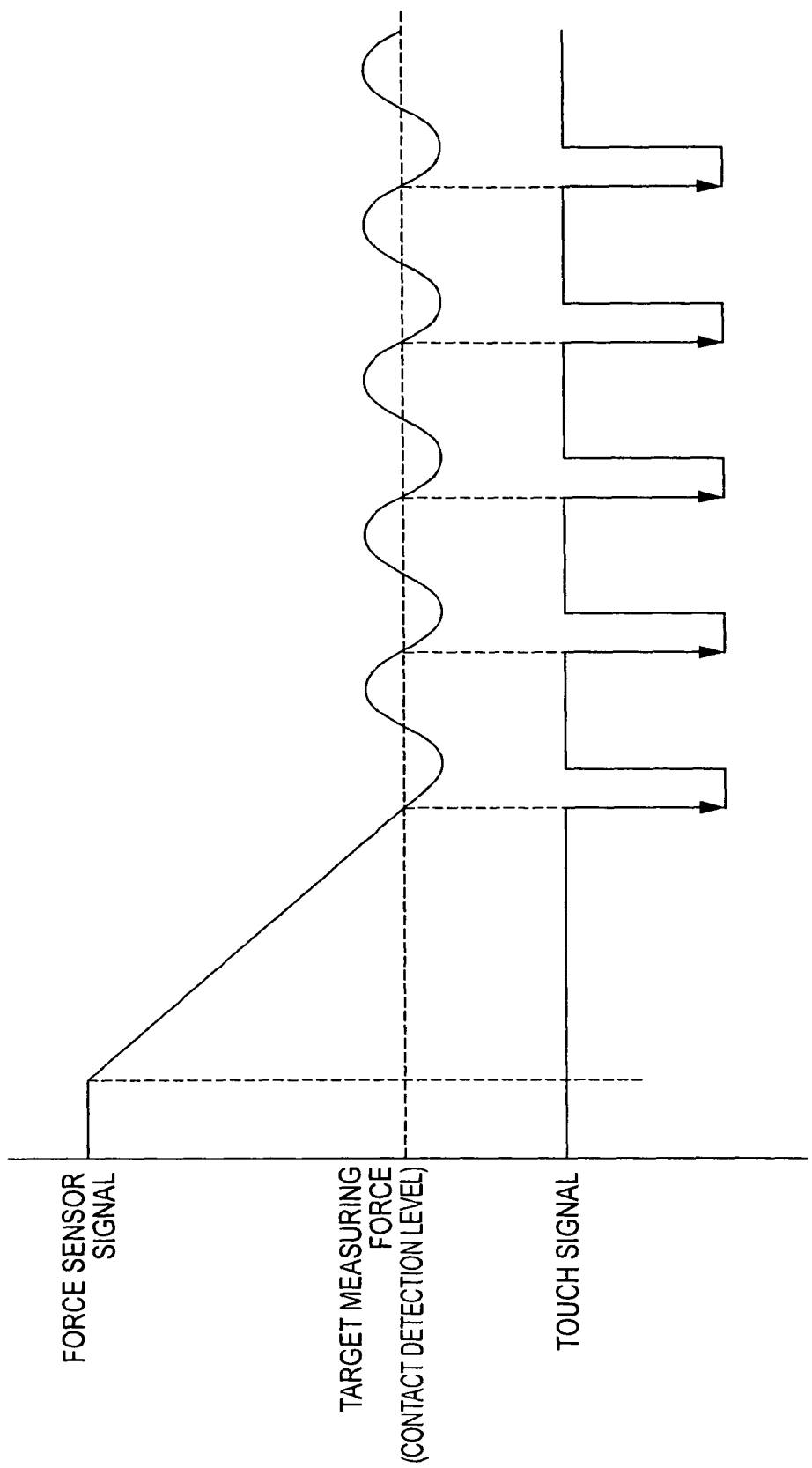
FIG. 2 is a diagram for showing a touch signal when a force sensor signal oscillates in the first embodiment.

For example, as shown in FIG. 2, the variation in the measuring force becomes large when the detection signal from the force sensor 1 (the force sensor signal) reaches the target measuring force and then oscillates.

Herein, each time the detection signal passes the target measuring force from a value higher than the target measuring force, the touch signal generator 51 generates the touch signal. The touch signal is given to the latch counter 52, so that the count value of the counter 26 is latched by the latch counter 52.

At the same time, the detection signal from the sensor 1 is also given to the measurement value collecting unit 55. The measurement value collecting unit 55 judges whether or not the fluctuation range of the detection signal from the force sensor 1 is within the preset certain range. When the fluctuation range of the detection signal is within the preset certain range, the measurement value collecting unit 55 collects the position measurement value from the counter 26 at a predetermined time interval. When the detection signal from the force sensor 1 oscillates and its oscillation range exceeds the preset certain range, the measurement value collecting unit 55 collects a value of the latch counter 52, namely the position measurement value that the latch counter 52 latches each time the touch signal is generated from the touch signal generator 51.

Since scanning controller 54 is in operation even when the detection signal from the force sensor 1 oscillates, an average value of the oscillation of the detection signal from the force sensor 1 is controlled to substantially coincide with the target measurement value.

Since the touch signal is generated when the detection signal coincides with the contact measuring force, it is possible to collect the measurement value with the constant measuring force. In other words, the measurement value is a value obtained when the measuring force is constant, so that it is possible to obtain the measurement value equivalent to that in the constant force control. As a result, it is possible to suppress the variation in the measurement value.

Further, since the touch signal is generated during tracing the profile of the workpiece (during the scanning control), a touch-back operation of a related-art touch probe is not required, thereby shortening measurement time. In short, time loss accompanying the touch-back operation can be eliminated.

Accordingly, even in the presence of the specific fluctuation caused by the surface texture of the workpiece and the like and the disturbance, the scanning measurement can be conducted with the constant measuring force while ensuring high precision and avoiding an increase in the measurement time.

The above-described way contains a drawback that the touch signal cannot be generated at an arbitrarily selected regular cycle. Hence, the following methods can be suggested to compensate for the drawback.

<(1) Method for Shortening Touch Signal Generation Cycle by Changing Touch Signal Generation Condition>

Figure 3:
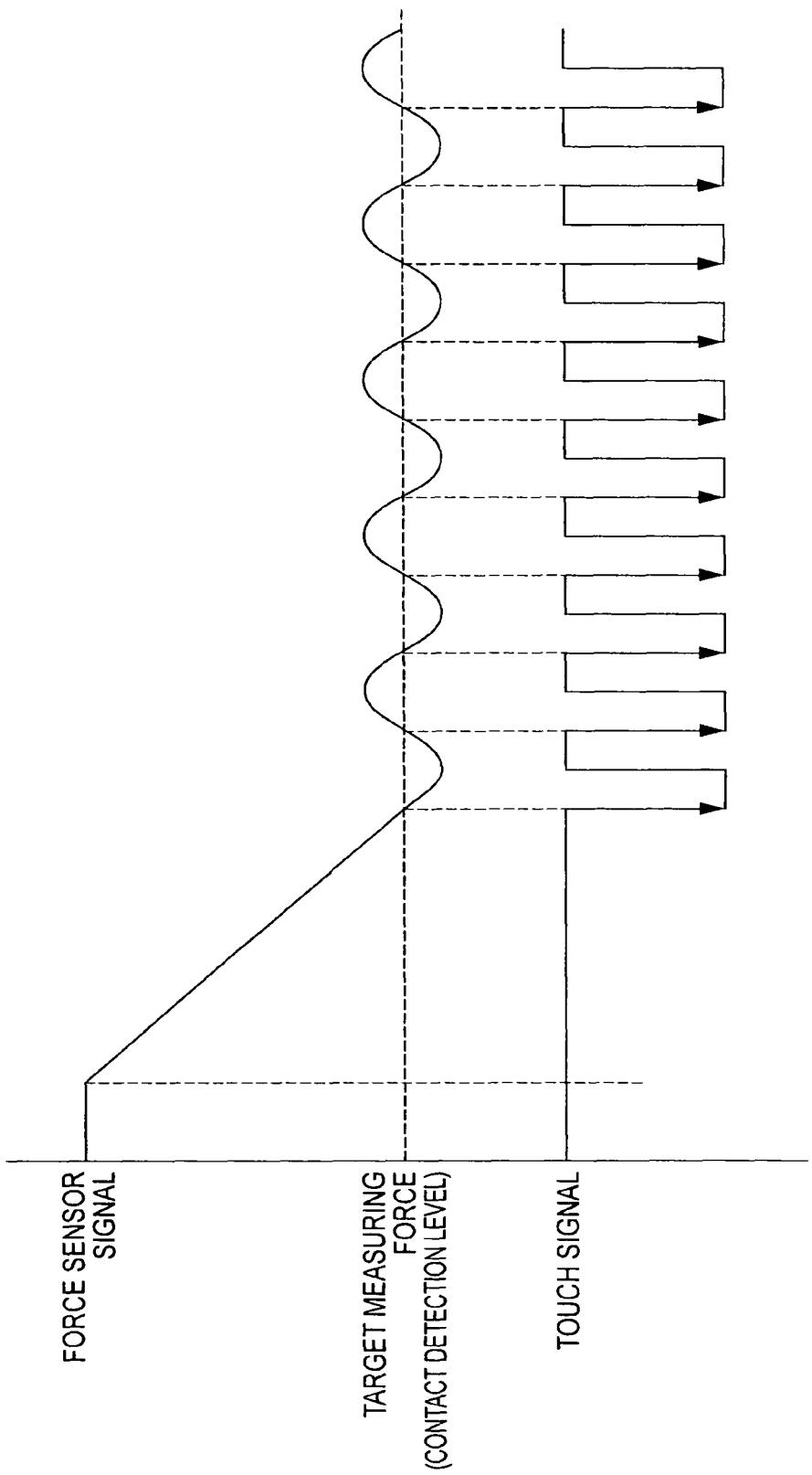
FIG. 3 is a diagram for showing the touch signal when the force sensor signal oscillates in the first embodiment.

Although a method explained in FIG. 2 employs a circuit that generates the touch signal only when the detection signal of the force sensor 1 passes the contact detection level from a higher value to a lower value of the level, herein the touch signal is generated at both time points when the detection signal passes from a higher value to a lower value and from a lower value to a higher value as shown in FIG. 3. In short, the touch signal generator 51 of FIG. 1 is provided to a circuit that generates the touch signal at both of the time points. This arrangement can shorten the touch signal generation cycle, thereby enhancing the precision. (FIGS. 2 and 3 show a case where the target measuring force of the scanning controller 54 and the contact measuring force of the touch signal generator 51 have the same value.)

Note that the above-described method can be used together with a next-described method (2) for high frequency oscillation by increasing a gain of the force control loop.

<(2) Method for High Frequency Oscillation by Increasing Gain of Force Control Loop>

There are two reasons for unstable constant force scanning control.
(a) The force is disturbed by the disturbance that the force control cannot suppress.
(b) High gain of the force control loop causes unstable high frequency range, triggering an oscillating state.

The state in (b) is undesirable in a normal control. However, in the present method, it is possible to acquire the measurement value with smaller variation even in the above-stated oscillating state. When the oscillation is caused by the high gain of the force control loop, the oscillation is often at a resonance frequency in the high frequency range of a mechanical system of the probe. Hence, by utilizing this oscillation phenomenon, continuous touching in a high cycle can be realized.

Specifically, similarly to FIG. 14, the scanning controller 54 includes: the processing unit 23 that computes the deviation between the detection signal from the force sensor 1 and the target measuring force and outputs the computed deviation; the force control compensator 24 as the gain adjusting unit that amplifies the output signal from the processing unit 23 by a setting gain and outputs the amplified signal; and the drive amplifier 25 that drives the actuator 11 as the relative movement unit based on the output from the force control compensator 24. Thus, an operator manually adjusts or switches the gain of the force control compensator 24 to high when a scanning point of the force sensor 1 and the workpiece enters a region in which the detection signal from the force sensor 1 oscillates, for example.

Alternatively, a circuit that detects that the detect signal from the force sensor 1 is oscillatory and that the oscillation range exceeds the preset certain range may be provided and, by the use of the circuit, the gain of the force control compensator 24 is adjusted or switched to high.

With such an arrangement, an oscillating state of the detection signal from the force sensor 1 can be obtained, so that the position measurement value from the detector 12 can be obtained cyclically at rapid timing. Hence, the precision can be more enhanced.

Second Embodiment

Figure 4:
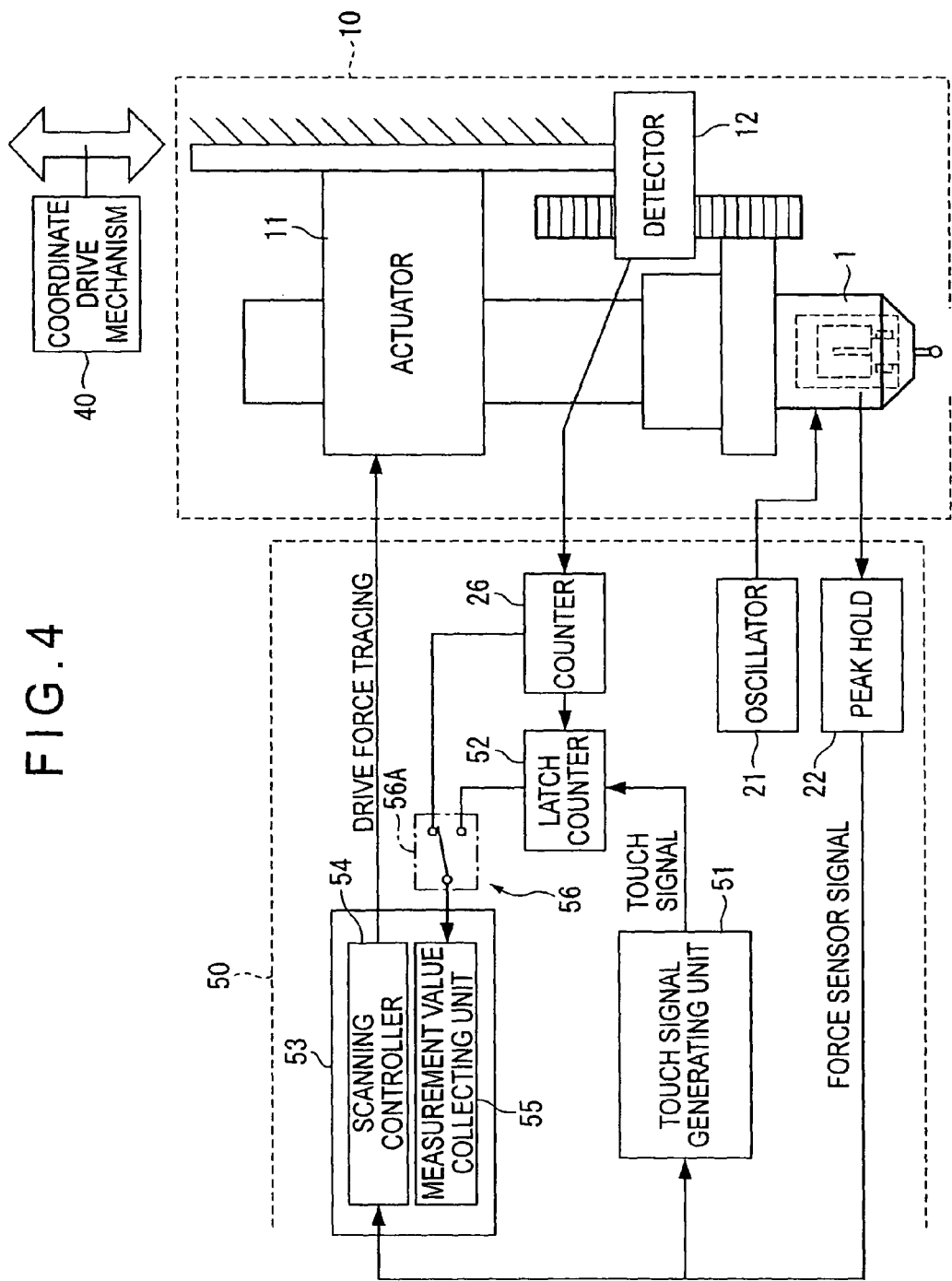
FIG. 4 is a block diagram showing a second embodiment of the surface texture measuring instrument according to the invention.

Description of Second Embodiment (FIG. 4)

In the first embodiment, the value of the latch counter 52 is collected at the timing of the generation of the touch signal on condition that the detection signal from the force sensor 1 exceeds the preset certain range. In the second embodiment, as shown in FIG. 4, a switch unit 56 that switches the scanning measurement mode and the touch measurement mode is provided.

The switch unit 56 includes a switching portion 56A that switches the scanning measurement mode and the touch measurement mode in accordance with the surface profile of the workpiece based on a selection by a user. In short, the switching portion 56A is inserted on a measurement value collecting unit 55 side to enable a switching between terminals of the counter 26 and the latch counter 52.

When the scanning controller 54 is in operation and the switching portion 56A of the switch unit 56 is switched to one side (a counter 26 side), the measurement value collecting unit 55 collects the position measurement value (the measuring point information) from the counter 26 as the position detecting unit at a predetermined time interval. When the switching portion 56A is switched to the other side (a latch counter 52 side), the measurement value collecting unit 55 collects the count value of the latch counter 52, namely the count value that is latched by the latch counter 52 each time the touch signal is generated from the touch signal generator 51.

In such an arrangement, the user judges the surface profile of the workpiece and switches the switching portion 56A of the switch unit 56 to the other side (the latch counter 52 side) when the scanning position of the force sensor 1 and the workpiece enters a region in which the detection signal from the force sensor 1 may be oscillatory. Then, the measuring value of the counter 26 is latched by the latch counter 52 each time the touch signal is generated from the touch signal generator 51 and the measurement value is collected by the measurement value collecting unit 55, thereby providing advantages similar to those described above.

Hence, according to the second embodiment, the user monitors an inclination or a curvature of the surface of the workpiece and selects which part of the surface of the workpiece is to be scanning-measured or touch-measured. Since the user can arbitrarily select the measuring mode by switching the switching portion, the measurement mode can be selected more speedily and appropriately as compared with, for example, a case in which the instrument automatically selects the most appropriate measurement mode by repeating the scan-measurement and the touch measurement in a trial-and-error manner, thereby realizing an effective measurement.

Figure 5:
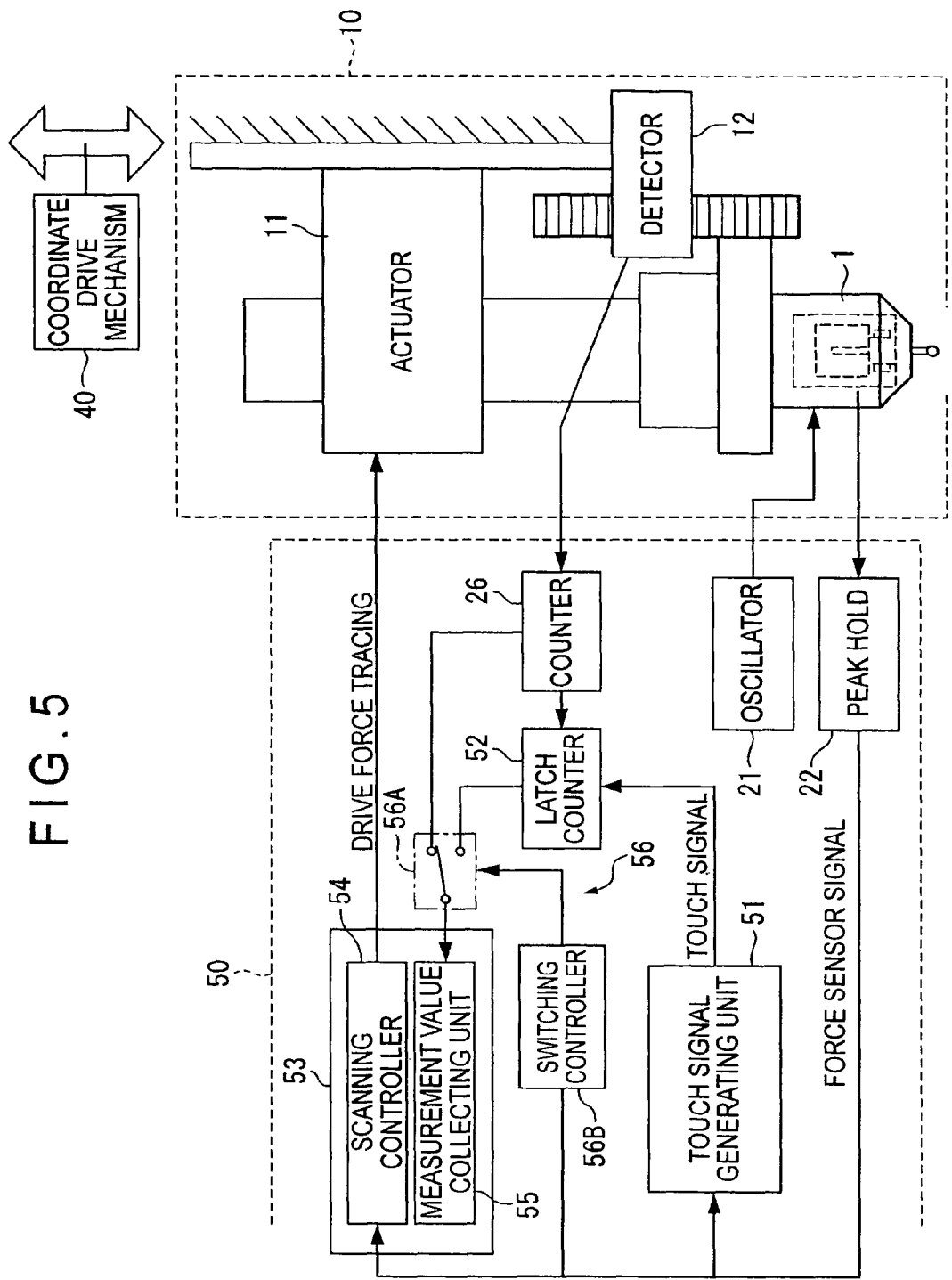
FIG. 5 is a block diagram showing a modification of the second embodiment.

Description of Modification of Second Embodiment (FIG. 5)

In the second embodiment, the switching portion 56A of the switch unit 56 may be automatically switched instead of being manually switched by the user.

For example, in a modification shown in FIG. 5, the switch unit 56 includes the switching portion 56A that switches the scanning measurement mode and the touch measurement mode and a switching controller 56B that controls the switching portion 56A. The switching controller 56B switches the switching portion 56A based on changes in the force sensor signal detected by the force sensor 1 as the measuring force detecting unit.

In the scanning measurement, the force sensor signal from the force sensor 1 may be oscillatory depending on the surface profile or the material of the workpiece. In this state, the measuring force fluctuates, so that the measurement cannot be conducted with the constant measuring force. In an example shown in FIG. 5, since the switching controller 56B switches the switching portion 56A to the latch counter 52 side based on the changes in the force sensor signal detected by the force sensor 1 (for example, when the force sensor signal oscillates and the oscillation range exceeds the preset certain range), the measurement mode can be selected more speedily and appropriately as compared with the case in which the user manually selects the most appropriate measurement mode in a trial-and-error manner by arbitrarily switching the switching portion, thereby realizing an effective measurement The switch unit 56 may be constituted by the switching portion 56A that switches between the scanning measurement mode and the touch measurement mode and the switching controller 56B that controls the switching portion 56A. The switching controller 56B may be adapted to switch the switching portion 56A based on the surface profile of the workpiece.

For example, the surface profile of the workpiece is calculated based on measurement data of already-conducted measurements, and the scanning measurement and the touch measurement may be switched based on the calculated curvature of the workpiece surface or a calculated angle formed between the workpiece surface and a measuring force detecting direction. Alternatively, the profile of the workpiece surface is obtained from design data of the workpiece and the curvature or the inclination of the workpiece surface is obtained from the design data. Then, the scanning measurement and the touch measurement may be switched based on the curvature or the inclination.

With such an arrangement, the surface profile of the workpiece can be analyzed and a switching control to switch to the touch measurement can be conducted based on the curvature or the inclination, so that the user does not need to judge and switch, thereby simplifying the measurement. Even when the workpiece has a surface profile that cannot be measured in the scanning measurement, the profile measurement can be automatically conducted in the touch measurement.

Third Embodiment

Figure 6:
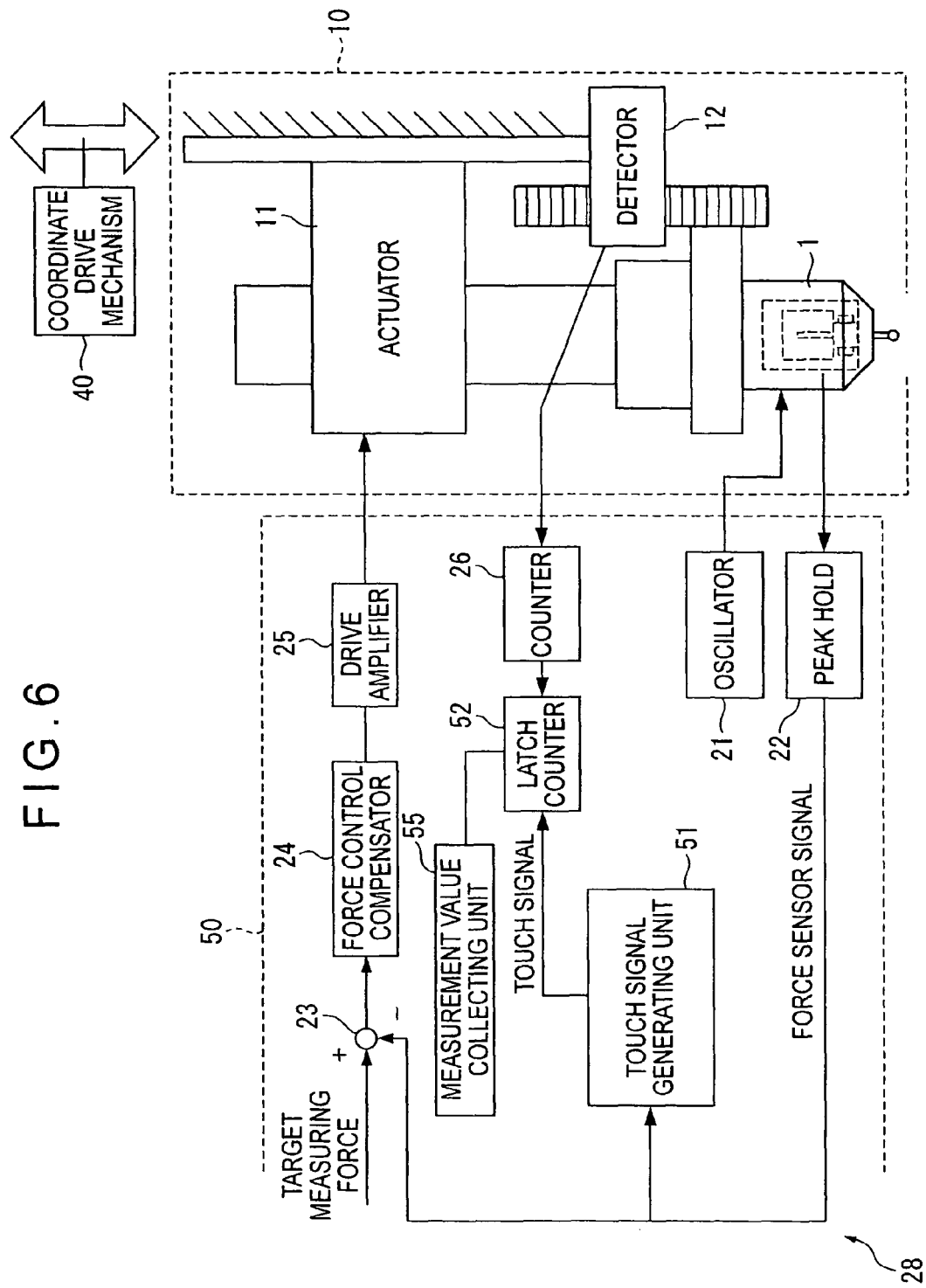
FIG. 6 is a block diagram showing a third embodiment of the surface texture measuring instrument according to the invention.

Description of Third Embodiment (FIG. 6)

The first embodiment employs the arrangement in which a constant scanning force control is firstly conducted with an appropriately-set gain of the force control compensator 24 of the scanning controller 54. In the arrangement, the gain of the force control compensator 24 is adjusted or switched to high by the user when, for example, the scanning point of the force sensor 1 and the workpiece enters the region in which the detection signal from the force sensor 1 oscillates or it is adjusted or switched with the circuit provided for detecting that the detection signal from the force sensor 1 is oscillatory and that the oscillation range exceeds the preset certain range.

As shown in FIG. 6, the controller 50 in the third embodiment includes: a force control loop 28 that collects the force sensor signal (the detection measuring force) detected by the force sensor 1 as the measuring portion and drives the actuator 11 (the relative movement unit) such that the force sensor signal coincides with the target measuring force; the touch signal generator 51 that collects the force sensor signal detected by the force sensor 1 and generates the touch signal when the force sensor signal coincides with the contact measuring force; and the measurement value collecting unit 55 that collects the measuring point information from the counter 26 each time the touch signal is generated from the touch signal generator 51. The controller 50 is arranged such that the scanning measurement can be conducted by presetting the force control loop 28 to an unstable state.

Similarly to the scanning controller 54 of FIG. 1 and the force control loop of FIG. 14, the force control loop 28 includes the processing unit 23 that outputs the deviation between the force sensor signal detected by the force sensor 1 (the measuring force detecting unit) and the target measuring force; the force control compensator 24 as the gain adjusting unit that amplifies the output from the processing unit 23 by the setting gain to output; and the drive amplifier 25 that amplifies the output from the force control compensator 24 to give the amplified output the actuator 11.

The force control loop 28 can be set such that the force sensor signal detected by the force sensor 1 oscillates. In other words, the setting gain of the force control compensator 24 of the force control loop 28 can be set such that the force sensor signal oscillates.

According to the third embodiment, the force control loop 28 is set such that the force sensor signal detected by the force sensor 1 oscillates in a state where the contact portion of the force sensor 1 contacts the surface of the workpiece. The scanning measurement is conducted in this state. Accordingly, each time the force sensor signal coincides with the contact measuring force, the touch signal is generated from the touch signal generator 51, and each time the touch signal is generated, the value of the counter 26 is latched by the latch counter 52 and then collected by the measurement value collecting unit 55.

In other words, since the touch signal is generated utilizing the oscillating state of the force sensor signal, a high-speed touch signal can be generated and the measuring point information can be collected at the timing of the generation of such a touch signal, thereby realizing a precise measurement. Particularly, since the measurement is conducted utilizing the unstable oscillation of the force control loop 28, it is possible to stably trace the profile with tolerance to the disturbance and to measure the workpiece including a steeply inclined surface, thereby increasing scanning speed.

Accordingly, even under the presence of the property fluctuation caused by the surface texture of the workpiece and the like and the disturbance, the scanning measurement can be conducted with the constant measuring force while ensuring high precision and avoiding an increase in the measurement time.

Since the force control loop 28 is in operation when the detection signal from the force sensor 1 oscillates, the average value of the oscillation of the detection signal from the force sensor 1 is controlled to substantially coincide with the target measurement value.

Fourth Embodiment

Figure 7:
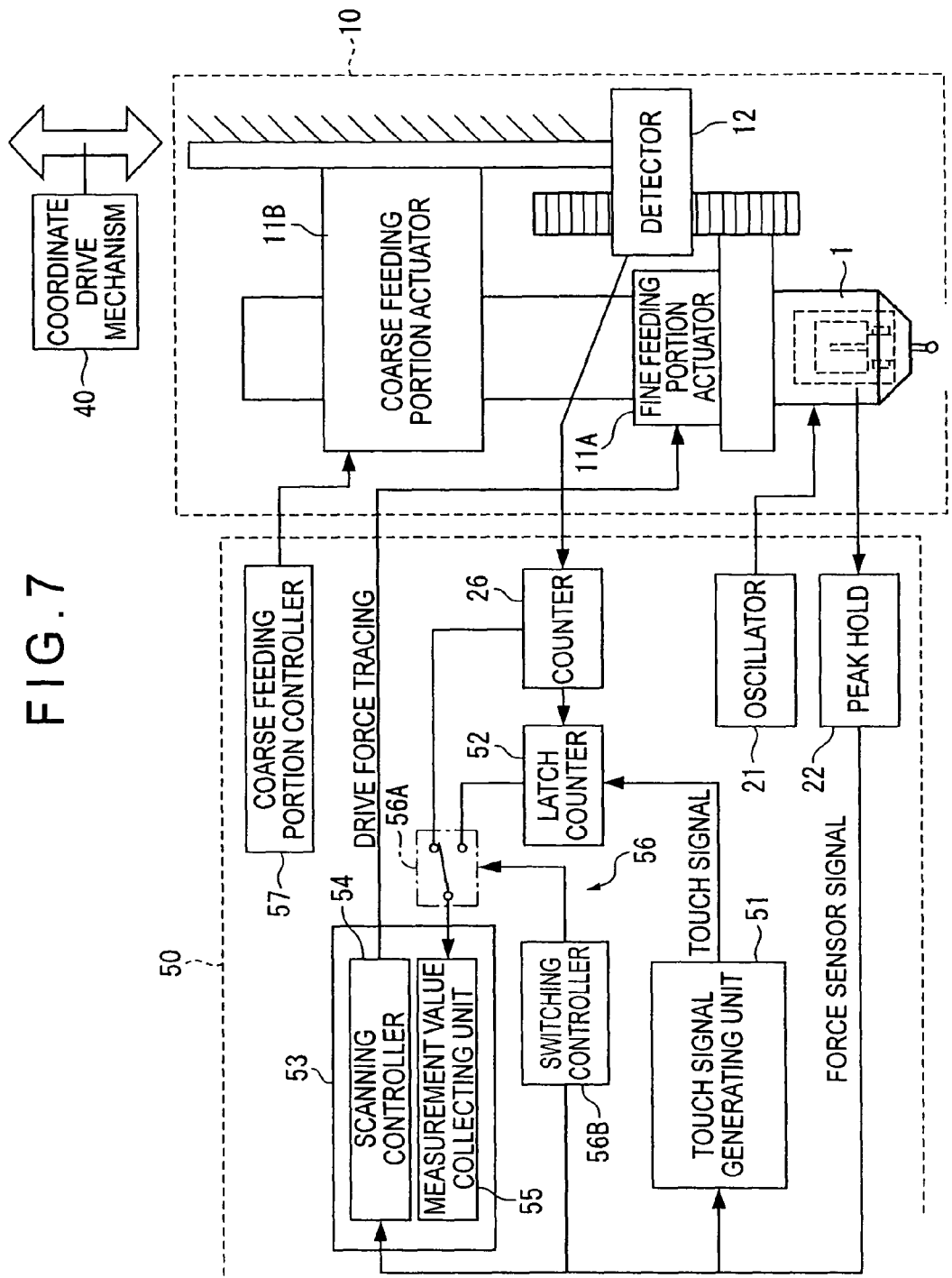
FIG. 7 is a block diagram showing a fourth embodiment of the surface texture measuring instrument according to the invention.

Description of Fourth Embodiment (FIG. 7)

Unlike the modification of the second embodiment (FIG. 5), in the fourth embodiment, the actuator 11 as the relative movement unit includes: a fine feeding portion actuator 11A as a fine feeding mechanism which finely displaces the force sensor 1 (the measuring portion); and a coarse feeding portion actuator 11B as a coarse feeding mechanism which displaces the force sensor 1 in corporation with the fine feeding portion actuator 11A by a larger amount than the fine feeding portion actuator 11A.

The fine feeding portion actuator 11A may be a drive mechanism with high response speed such as a piezoelectric actuator that uses a piezoelectric element. The coarse feeding portion actuator 11B may be an electromagnetic actuator, for example.

As stated above, the scanning controller 54 of the force control loop includes: the processing unit 23, the force control compensator 24; and the drive amplifier 25 that amplifies the output from the force control compensator 24 to give the amplified output to the fine feeding portion actuator 11A and the coarse feeding portion actuator 11B. The setting gain of the force control compensator 24 of the force control loop is adjustable.

In the fourth embodiment, a coarse feeding portion controller 57 is further provided which traces changes in the surface profile of the workpiece and controls the drive of the coarse feeding portion actuator 11B.

Since the fine feeding portion actuator 11A and the coarse feeding portion actuator 11B are provided in the fourth embodiment, in the scanning measurement, it is possible to speedily and finely displace the contact portion in response to fine unevenness of the workpiece surface with the fine feeding portion actuator 11A that has the high response speed, while it is possible to respond to a large profile change (undulation and the like) of the workpiece surface with the coarse feeding portion actuator 11B capable of responding to a large displacement. As a result, the contact portion can be moved in a scanning manner along the workpiece surface precisely and speedily.

Figure 8:
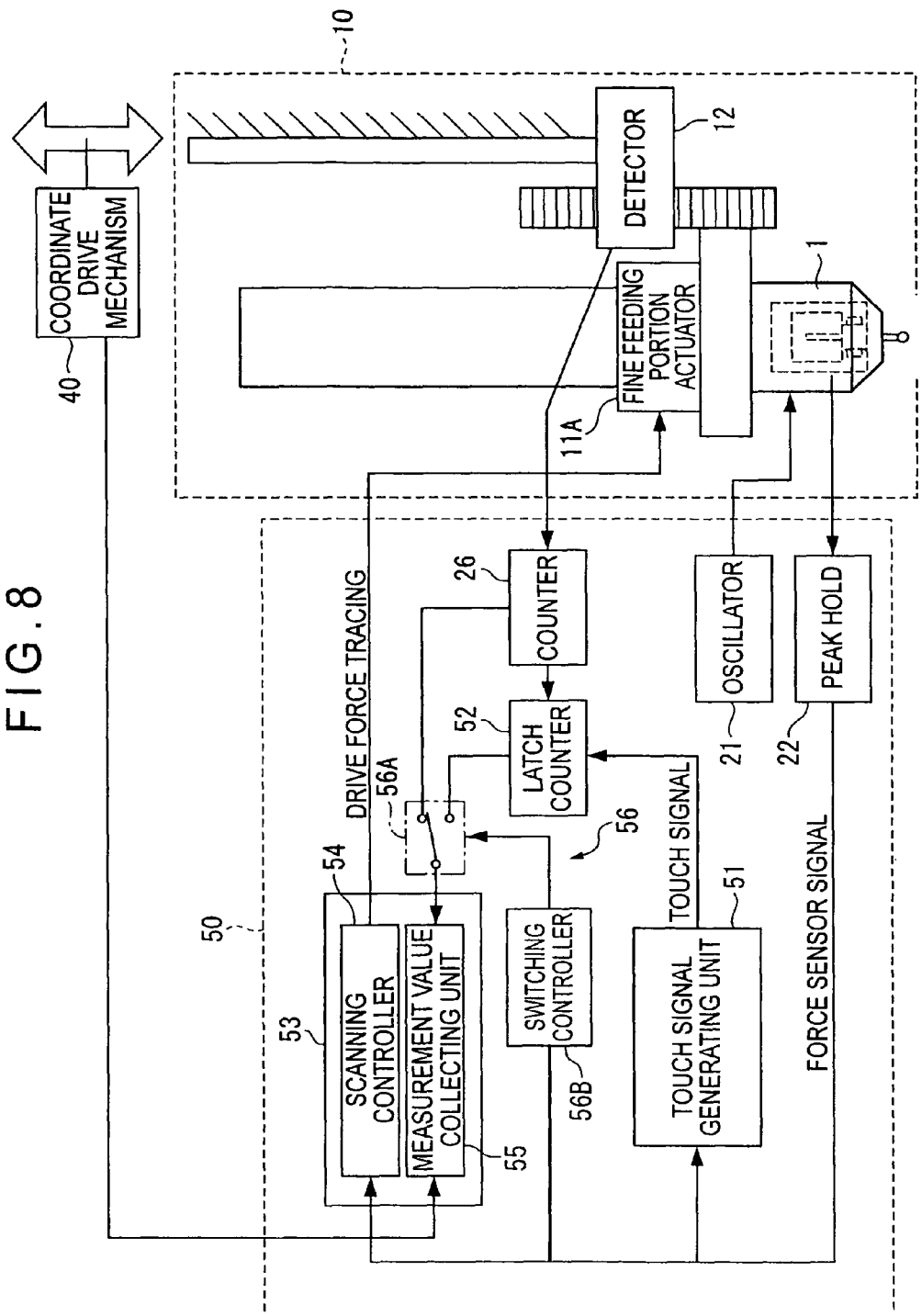
FIG. 8 is a block diagram showing a modification of the fourth embodiment.

Description of Modification of Fourth Embodiment (FIG. 8)

In the fourth embodiment, the actuator 11 includes the fine feeding portion actuator 11A and the coarse feeding portion actuator 11B. However, the coarse feeding portion actuator 11B may be substituted by the coordinate drive mechanism 40.

As shown in FIG. 8, the coarse feeding portion actuator 11B may be omitted and the coordinate drive mechanism 40 may be used to trace the profile. In such an arrangement, the position of the force sensor 1 can be obtained by adding the value of the detector 12 which is collected by the measurement value collecting unit 55 (the displacement amount of the force sensor 1) to the movement amount caused by the coordinate drive mechanism.

The arrangement of the fourth embodiment in which the fine feeding portion actuator 11A and the coarse feeding portion actuator 11B constitute the actuator 11 may be applied to the actuator 11 of the third embodiment.

<Description of Modifications>

The invention is not limited to the above-described embodiments, but modifications and improvements are also in the scope of the invention as long as an object of the invention can be achieved.

In the above-described embodiments, the base 2 of the force sensor 1 and the stylus 3 are integrally formed. However, the arrangement is not limited thereto and the base 2 and the stylus 3 may be separately formed. The base 2 and the stylus 3 may be arranged as separate components and the stylus 3 may be adhered and fixed on the base 2.

In the embodiments, the stylus 3 is adapted to oscillate in its axial direction, but the arrangement is not limited thereto. The stylus 3 may oscillate in a direction orthogonal to the axis of the stylus 3.

In the embodiments, the target measuring force of the scanning controller, the target measuring force of the force control loop and the contact measuring force of the touch signal generating unit are individually explained. However, those measuring forces may be the same as a value.

In the embodiments, an example is shown in which the position measurement value from the counter 26 (the measuring point information) is collected at a predetermined time interval, but the arrangement is not limited thereto. The position measurement value may be collected at a predetermined positional interval or using both of the predetermined time and positional intervals.

In the first embodiment (FIG. 1), an arrangement in which the actuator 11 is provided is exemplified, the arrangement is not limited thereto. The actuator 11 may not be provided. In this case, the scanning controller 54 controls the coordinate drive mechanism 40 (the X, Y and Z axes) and the measurement value collecting unit 55 collects, as the measurement value, a value obtained by adding the displacements of the axes (for example, the displacements along the X, Y and Z axes) of the coordinate drive mechanism to the position measurement value from the counter 26 or to the position measurement value of the latch counter 52.

In the embodiments, the coordinate drive mechanism 40 controls the three orthogonal axes of the X, Y and Z axes, but the arrangement is not limited thereto. A two-dimensional drive mechanism or a one-dimensional drive mechanism may be alternatively employed. Further, the drive mechanism is not limited to the directly moving type but may be a rotational movement type. In short, any arrangement may be employed as long as the probe 10 and the workpiece can be relatively driven and driving amounts thereof can be detected.

Figure 9:
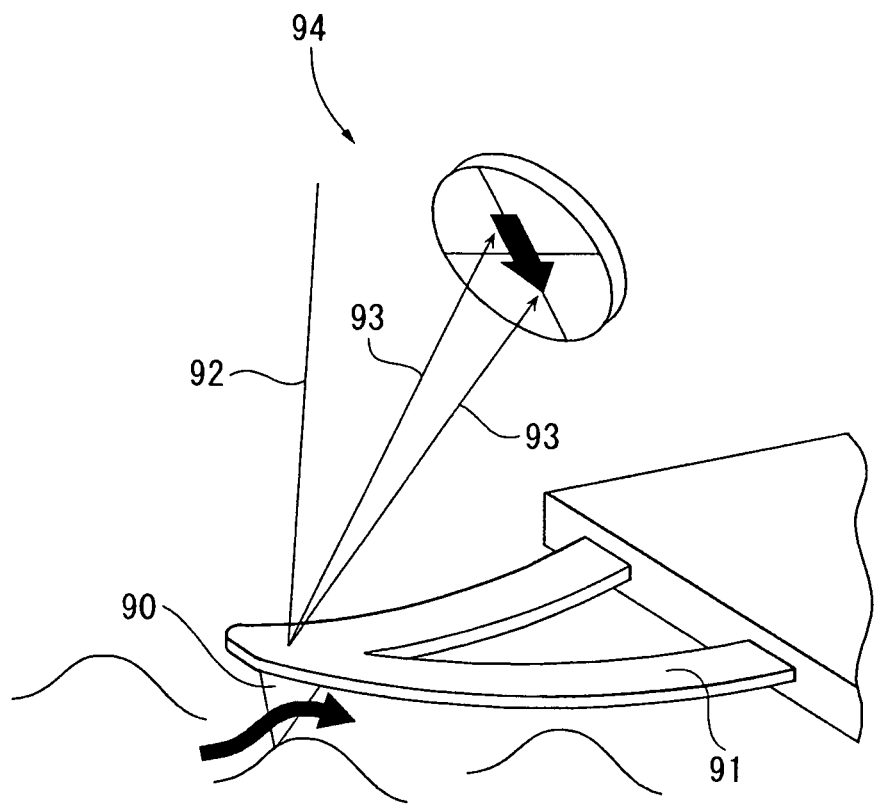
FIG. 9 is a perspective view showing a modification of a measuring portion.
Figure 10:
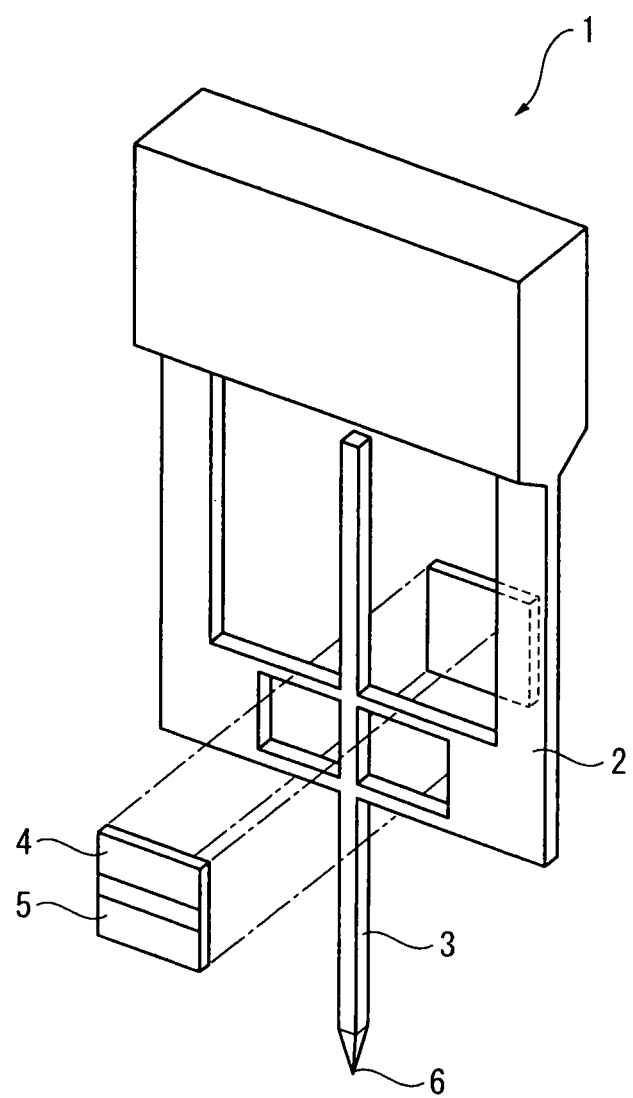
FIG. 10 is an exploded perspective view showing an arrangement of a force sensor.
Figure 11:
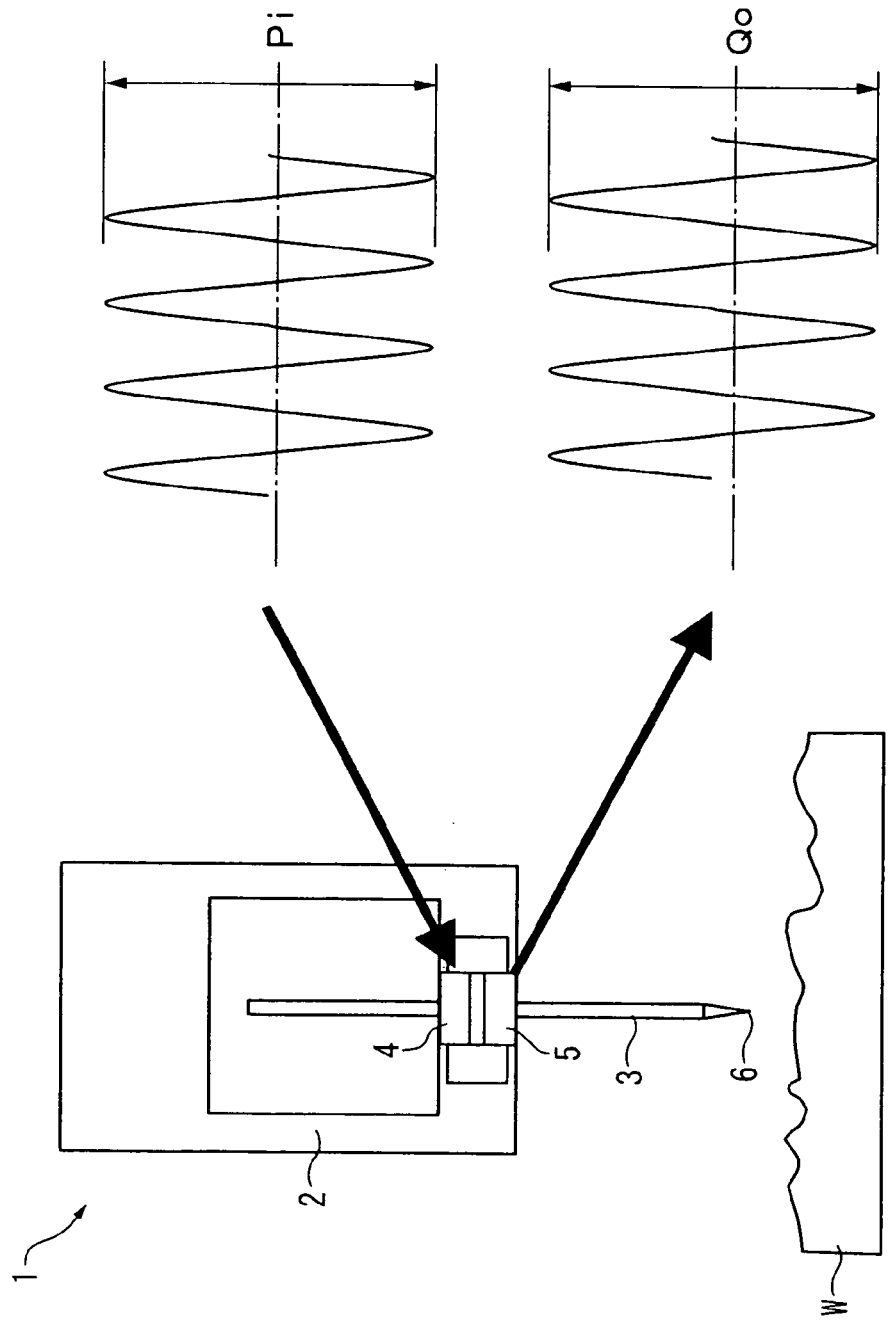
FIG. 11 is an illustration showing an oscillation signal and a detection signal which are given to the force sensor.
Figure 12:
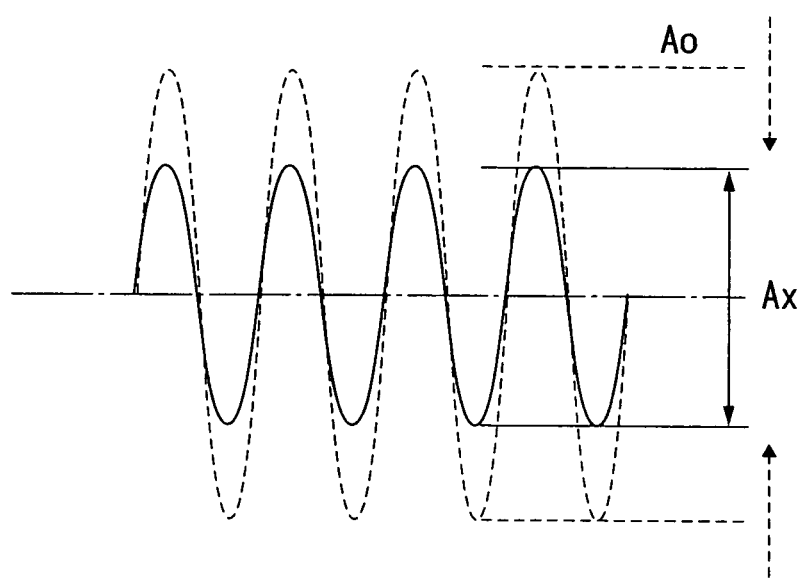
FIG. 12 is a diagram showing change in the detection signal when the force sensor contacts a workpiece.
Figure 13:
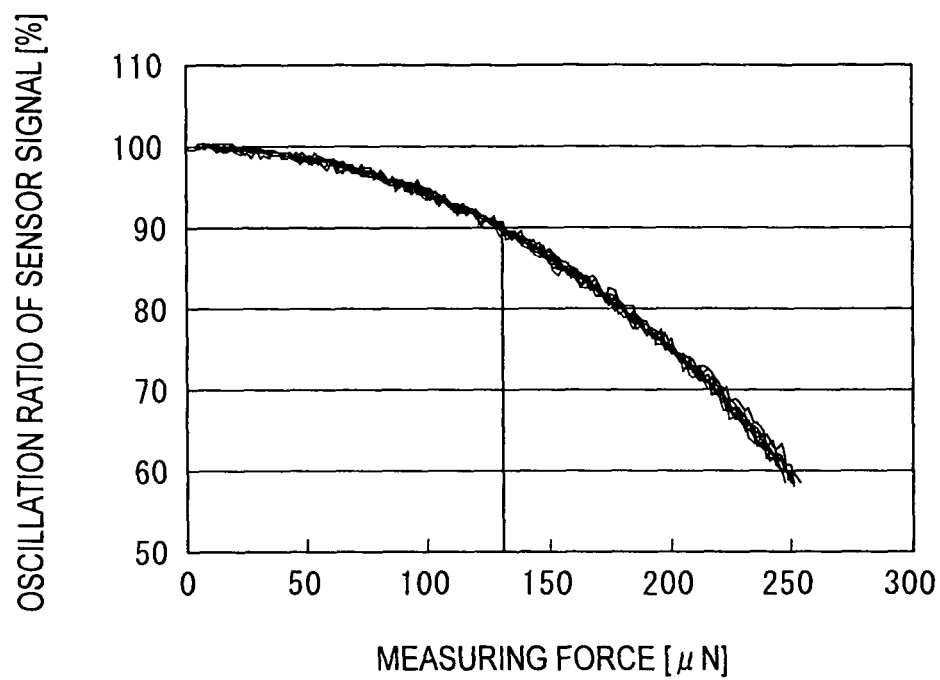
FIG. 13 is a graph showing a relationship between an attenuation ratio of the detection signal of the force sensor and a measuring force.

In the embodiments, the stylus that oscillates in its axial direction is used, but a sensing pin of the invention is not limited to that type and may have an arrangement shown in FIG. 9 for example.

A sensing pin 90 is provided to a drive movable portion of the actuator 11 (or the fine feeding portion actuator 11A and the coarse feeding portion actuator 11B) via an elastic lever 91 that is elastically deformable in a direction along an operation direction of the actuators, a longitudinal direction of the elastic lever 91 being substantially orthogonal to the operation direction of the actuators. When the sensing pin is brought into contact with the surface of the workpiece, the measuring force applied between the workpiece and the sensing pin 90 causes an elastic deformation of the elastic lever 91. Accordingly, changes in the measuring force can be obtained by detecting an amount of the elastic deformation of the elastic lever 91. For example, a detecting unit for the elastic deformation amount of the elastic lever 19 may be a distortion sensor or a detector 94 that irradiates a laser beam 92 to an upper surface of the elastic lever 91 and detects the elastic deformation amount of the elastic lever 91 based on reflected light 93 from the upper surface.

The priority application Number JP 2006-157870 upon which this patent application is based is hereby incorporated by reference.

What is claimed is:

1. A surface texture measuring instrument, comprising:
    a measuring portion including a stylus having a contact portion that contacts a surface of a workpiece and a measuring force detecting unit that detects a measuring force when the contact portion contacts the surface of the workpiece;
    a relative movement unit that relatively moves the measuring portion and the workpiece;
    a position detecting unit that outputs as measuring point information a measuring point on which the workpiece is measured by the measuring portion, the measuring point information from the position detecting unit being collected while the relative movement unit is driven with the contact portion of the stylus contacting the surface of the workpiece, a surface texture of the workpiece being measured from the measuring point information,
    a scanning controller that collects a detection measuring force from the measuring portion and drives the relative movement unit such that the detection measuring force substantially coincides with a target measuring force that is a predetermined setting value at which the detection measuring force is to be kept during a scanning measurement;

a touch signal generating unit that collects the detection measuring force from the measuring portion and generates a touch signal when the detection measuring force coincides with a contact measuring force that is a predetermined setting value at which a contact of the contact portion with the surface of the workpiece is detected; and a measurement value collecting unit that collects the measuring point information from the position detecting unit based on a predetermined condition when a fluctuation range of the detection measuring force from the measuring portion is within a preset certain range, the measurement value collecting unit collecting the measuring point information from the position detecting unit each time the touch signal is generated from the touch signal generating unit when the detection measuring force from the measuring portion oscillates and an oscillation range exceeds the preset certain range, when the scanning controller is in operation.

2. The surface texture measuring instrument according to claim 1, wherein the scanning controller includes a processing unit that computes a deviation between the detection measuring force from the measuring portion and the target measuring force and outputs the deviation; and a gain adjusting unit that amplifies an output signal from the processing unit by a setting gain, and gives the output signal to the relative movement unit, and the setting gain of the gain adjusting unit is adjustable such that the detection measuring force from the measuring portion oscillates.

3. The surface texture measuring instrument according to claim 1, wherein the relative moving unit includes: a fine feeding mechanism which finely moves the measuring section; and a coarse feed mechanism which moves the fine feeding mechanism and the measuring section more coarsely than the fine feeding mechanism, the scanning controller includes a processing unit that computes a deviation between the detection measuring force from the measuring portion and the target measuring force and outputs the deviation; and the gain adjusting unit that amplifies an output signal from the processing unit by a setting gain and gives the output signal to the fine feeding mechanism, and the setting gain of the gain adjusting unit is adjustable such that the detection measuring force from the measuring portion oscillates.

4. The surface texture measuring instrument according to claim 1, wherein the touch signal generating unit generates the touch signal when the detection measuring force from the measuring portion passes the contact measuring force from a value higher than the contact measuring force and when the detection measuring force from the measuring portion passes the contact measuring force from a value lower than the contact measuring force.

5. The surface texture measuring instrument according to claim 1, wherein the measuring portion includes: an oscillation element that oscillates the stylus; and a detection element that detects an oscillation of the stylus and outputs a detection signal.

* * * * *